United States Patent
Zeine et al.

(10) Patent No.: US 11,025,102 B2
(45) Date of Patent: Jun. 1, 2021

(54) DIRECTIONAL WIRELESS POWER AND WIRELESS DATA COMMUNICATION

(71) Applicant: Ossia Inc., Redmond, WA (US)

(72) Inventors: Hatem I. Zeine, Bellevue, WA (US); Robert Giometti, Bellevue, WA (US)

(73) Assignee: OSSIA INC., Redmond, WA (US)

( * ) Notice: Subject to any disclaimer, the term of this patent is extended or adjusted under 35 U.S.C. 154(b) by 75 days.

(21) Appl. No.: 16/519,473

(22) Filed: Jul. 23, 2019

(65) Prior Publication Data

US 2019/0348872 A1 Nov. 14, 2019

Related U.S. Application Data

(63) Continuation of application No. 15/962,479, filed on Apr. 25, 2018, now Pat. No. 10,361,595.

(51) Int. Cl.
| | |
|---|---|
| H02J 50/80 | (2016.01) |
| H02J 50/40 | (2016.01) |
| H02J 50/20 | (2016.01) |
| H01Q 3/30 | (2006.01) |
| H02J 7/02 | (2016.01) |
| H04W 48/12 | (2009.01) |

(52) U.S. Cl.
CPC ............ *H02J 50/80* (2016.02); *H01Q 3/30* (2013.01); *H02J 50/20* (2016.02); *H02J 50/40* (2016.02); *H02J 7/025* (2013.01); *H04W 48/12* (2013.01)

(58) Field of Classification Search
CPC .. H02J 50/20; H02J 50/40; H02J 50/80; H02J 7/025; H01Q 3/30; H04W 48/12

USPC .......................................................... 307/31
See application file for complete search history.

(56) References Cited

U.S. PATENT DOCUMENTS

| | | | |
|---|---|---|---|
| 10,211,685 B2 | 2/2019 | Bell et al. | |
| 2007/0002722 A1 | 1/2007 | Palaskas et al. | |
| 2010/0315045 A1 | 12/2010 | Zeine | |
| 2012/0326660 A1 | 12/2012 | Lu et al. | |
| 2014/0051461 A1 | 2/2014 | Ranki et al. | |
| 2014/0217967 A1 | 8/2014 | Zeine et al. | |
| 2014/0269986 A1 | 9/2014 | Nagode et al. | |
| 2015/0130293 A1* | 5/2015 | Hajimiri | H01Q 21/225 307/104 |
| 2016/0099757 A1 | 4/2016 | Leabman et al. | |
| 2016/0299210 A1 | 10/2016 | Zeine | |
| 2016/0301259 A1 | 10/2016 | Zeine et al. | |
| 2016/0301264 A1* | 10/2016 | Zeine | H02J 50/80 |
| 2016/0356860 A1 | 12/2016 | Zeine et al. | |
| 2016/0359380 A1* | 12/2016 | Zeine | H02J 7/025 |
| 2017/0085127 A1 | 3/2017 | Leabman | |

(Continued)

OTHER PUBLICATIONS

IEEE Standard for Low-Rate Wireless Networks, IEEE 802.15.4-2015 (Dec. 5, 2015).

(Continued)

*Primary Examiner* — John W Poos
(74) *Attorney, Agent, or Firm* — Volpe Koenig

(57) ABSTRACT

Methods and apparatus are disclosed of a wireless power transmission system (WPTS) and wireless power receiver client (WPRC). The WPTS may directionally transmit wireless power to a first WPRC while concurrently directionally transmitting wireless data to at least a second WRPC. The WPTS and WPRC may reuse circuitry configured to transmit/receive wireless power to also transmit/receive wireless data.

20 Claims, 15 Drawing Sheets

(56) References Cited

U.S. PATENT DOCUMENTS

2017/0111243 A1 4/2017 Bell et al.
2019/0140487 A1 5/2019 Zeine et al.
2019/0199145 A1 6/2019 Zeine et al.

OTHER PUBLICATIONS

Rotenberg et al., "An Efficient Rectifier for an RDA Wireless Power Transmission System Operating at 2.4 GHz," $32^{nd}$ URSI GASS, Montreal (Aug. 19-26, 2017).

* cited by examiner

| PREAMBLE 1010 | TARGET WPTS ID 1020 | WPRC ID 1030 | SESSION ID 1040 | MESSAGE TYPE 1050 | PAYLOAD 1060 | CHECKSUM 1070 |

DIRECTIONAL WIRELESS POWER AND WIRELESS DATA COMMUNICATION

CROSS REFERENCE TO RELATED APPLICATION

This application is a continuation of U.S. patent application Ser. No. 15/962,479, filed Apr. 25, 2018, which is incorporated by reference as if fully set forth.

FIELD OF INVENTION

The embodiments described herein are improvements in the field of wireless power delivery with concurrent wireless data communication.

BACKGROUND

Conventional wireless power delivery charges a battery of an electronic device over a short range. Wireless charging has been limited to magnetic or inductive charging based solutions requiring the electronic device to be in contact with or within very close proximity to the wireless charger In addition to the circuitry needed to support wireless charging and the short-range required for wireless charging, conventional wirelessly charged electronics also require separate circuitry for data communication. Support separate data communication such as Bluetooth™, Wi-Fi™, Zig-Bee™, etc. require additional hardware and power to communicate via associated communication channels. The power and cost associated with supporting these separate data communications are disadvantageous. Therefore, a need exists to implement wireless power circuitry that is capable of safely and effectively charging electronic devices over a larger distance and to utilize the same wireless power circuitry to also support two-way data communication between the electronic device and the wireless power charger.

SUMMARY

Disclosed herein are embodiments of wireless power transmission systems (WPTSs) and wireless power receiver clients (WPRCs) capable of transmitting and receiving wireless power and wireless data using a unified transmitter and/or receiver, and methods performed thereby. In an example embodiment, a WPTS may comprise an array of antennas and a wireless receiver operably coupled to the array of antennas. The wireless receiver may be configured to receive, via at least a first portion of the array of antennas, a first WPRC and receive, via at least a second portion of the array of antennas, a second wireless beacon from a second WPRC. The WPTS may also include a processor operably coupled to the wireless receiver. The processor may be configured to determine a first configuration of phase settings for the at least first portion of the array of antennas based on the first wireless beacon. The processor may be further configured to determine a second configuration of phase settings for the at least second portion of the array of antennas based on the second wireless beacon. The WPTS may further include a wireless transmitter operably coupled to the array of antennas. The wireless transmitter may be configured to directionally transmit wireless power, via the at least first portion of the array of antennas, to the first WPRC using the first configuration of phase settings while simultaneously directionally transmitting data, via the at least second portion of the array of antennas, to the second WPRC using the second configuration of phase settings.

In another embodiment, the first wireless beacon may include a first in-phase component and a first quadrature-phase component and the second wireless beacon may include a second in-phase component and a second quadrature-phase component. The processor may be further configured to determine a first complex conjugate of the first wireless beacon and determine a second complex conjugate of the second wireless beacon. The wireless power directionally transmitted to the first WPRC may be focused at a location of the first WPRC using the first complex conjugate and the data directionally transmitted to the second WPRC may be focused at a location of the second WPRC using the second complex conjugate.

In another embodiment, the first complex conjugate may be calculated for each antenna of the at least first portion of the array of antennas and the second complex conjugate may be calculated for each antenna of the at least second portion of the array of antennas.

In another embodiment, a power level of the wireless power focused at the location of the first WPRC may be approximately +30 dBm and a power level of the data focused at the location of the second WPRC may be approximately −14 dBm.

In another embodiment, the WPTS may calculate the first complex conjugate for each antenna of the at least first portion of the array of antennas and may calculate the second complex conjugate for each antenna of the at least second portion of the array of antennas.

In another embodiment, the WPTS may transmit both the wireless power to the first WPRC and the data to the second WPRC based on a sum transmission. The sum transmission may include a sum in-phase component and a sum quadrature-phase component. The sum in-phase component may be a sum of an in-phase component of the first complex conjugate and a scaled-down version of an in-phase component of the second complex conjugate. The sum quadrature-phase component may be a sum of a quadrature-phase component of the first complex conjugate and a scaled-down version of a quadrature-phase component of the second complex conjugate.

In another embodiment, the scaled-down version of the in-phase component of the second complex conjugate and the scaled-down version of the quadrature-phase component of the second complex conjugate may be scaled-down by a selected amount, for example, by approximately 34 dB.

In another embodiment, the at least the first portion of the array of antennas may be the same as the at least the second portion of the array of antennas. The at least first portion of the array of antennas and the at least second portion of the array of antennas may constitute all of the antennas of the array of antennas.

In another embodiment, the WPTS may receive a respective wireless beacon from each of at least a third WPRC. The WPTS may determine a respective configuration of phase settings associated with the array of antennas for each of the at least third WPRC based on the respective wireless beacon. The WPTS may directionally transmit, simultaneously to the directional transmission of wireless power to the first WPRC, respective other data to each of the at least third WPRC using the respective configuration of phase settings.

In another embodiment, each respective wireless beacon from each of the at least third WPRC may include a respective in-phase component and a respective quadrature-phase component. The WPTS may determine a respective complex conjugate of each of the at least third wireless beacon, and the respective other data directionally transmitted to each of the at least third WPRC may be focused by the WPTS at a respective location of each of the at least third WPRC using the respective complex conjugate of each of the at least third wireless beacon.

In another embodiment, a WPTS may include an array of antennas and a wireless receiver coupled to the array of antennas. The wireless receiver may be configured to receive, via at least a first portion of the array of antennas, a first wireless beacon from a first WPRC. The WPTS may further include a wireless transmitter operably coupled to the array of antennas. The WPTS may further include a processor that may be configured to determine a first configuration of phase settings for the at least first portion of the array of antennas based on the first wireless beacon. The processor may be further configured to determine a number of WPRCs present.

On a first condition that the processor determines that one WPRC is present, the wireless transmitter may be further configured to, in a multiplexed fashion, directionally transmit wireless power and data, via the at least first portion of the array of antennas, to the first WPRC using the first configuration of phase settings.

On a second condition that the processor determines that the first WPRC and at least a second WPRC are present, the wireless receiver may be further configured to receive, via at least a second portion of the array of antennas, a second wireless beacon from a second WPRC. On the second condition, the processor may be further configured to determine a second configuration of phase settings for the at least second portion of the array of antennas based on the second wireless beacon. On the second condition, the wireless transmitter may also be further configured to directionally transmit wireless power, via the at least first portion of the array of antennas, to the first WPRC using the first configuration of phase settings while simultaneously directionally transmitting data, via the at least second portion of the array of antennas, to the second WPRC using the second configuration of phase settings.

In another embodiment, the WPTS may be configured to, on the first condition, transmit the wireless power on a different frequency, during a different time period, or both on a different frequency and during a different time period than the data.

BRIEF DESCRIPTION OF THE DRAWINGS

FIG. 10 depicts an example format for a beacon signal transmitted by a WPRC to a WPTS.

DETAILED DESCRIPTION OF THE PREFERRED EMBODIMENTS

Figure 1:
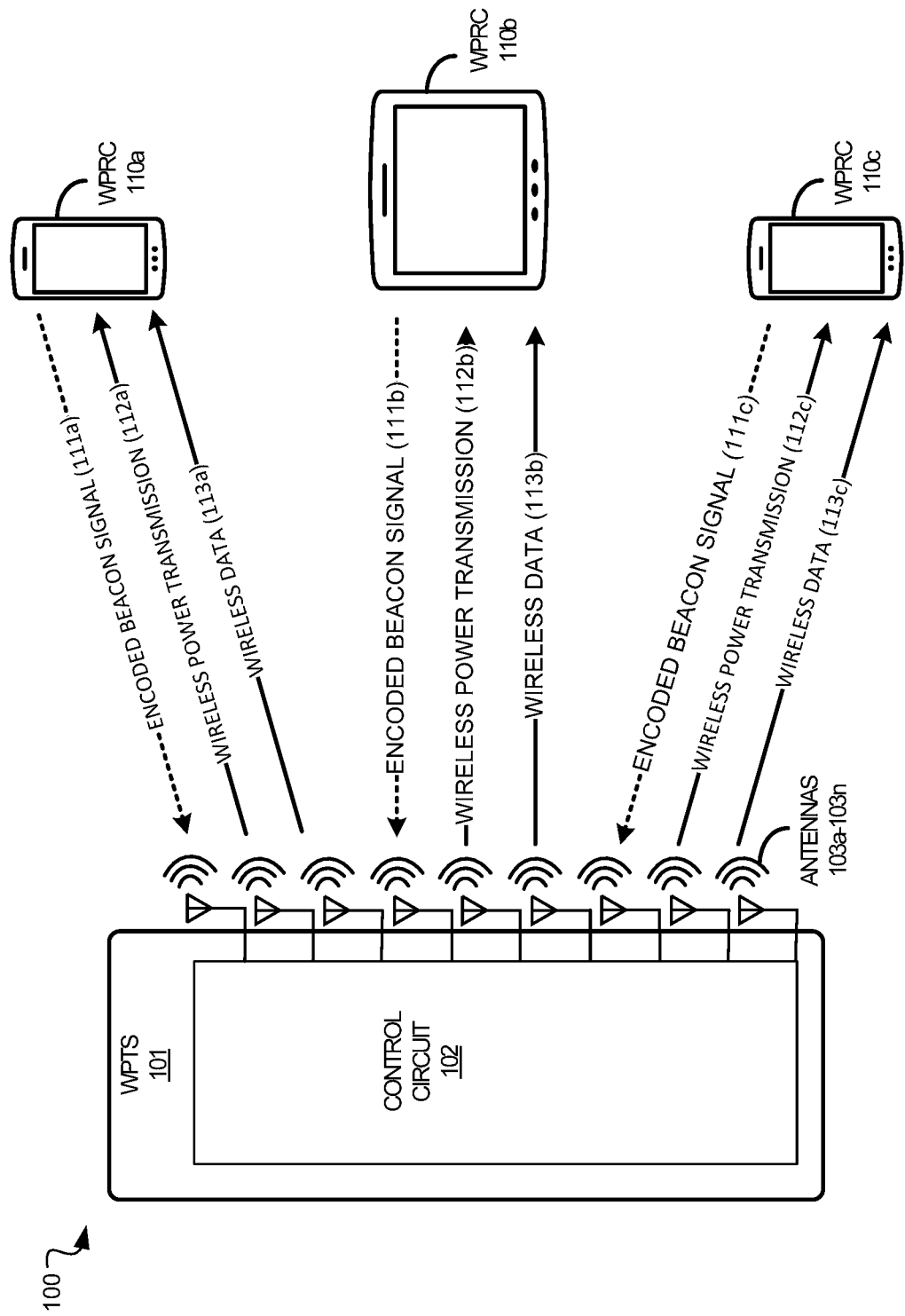
FIG. 1 depicts a system diagram including an example wireless power transmission environment.

FIG. 1 depicts a system diagram including an example wireless power transmission environment 100 illustrating wireless power delivery from one or more wireless power transmission systems (WPTSs), such as WPTS 101. More specifically, FIG. 1 illustrates power transmission to one or more wireless power receiver clients (WPRCs) 110*a*-110*c*. WPTS 101 may be configured to receive encoded beacons 111*a*-111*c* from and transmit wireless power 112*a*-112*c* and wireless data 113*a*-113*c* to WPRCs 110*a*-110*c*. WPRCs 110*a*-110*c* may be configured to receive and process wireless power 112*a*-112*c* from one or more WPTSs, such as WPTS 101. Components of an example WPTS 101 are shown and discussed in greater detail below, as well as in FIG. 2. Components of an example WPRC 110*a*-110*c* are shown and discussed in greater detail with reference to FIG. 3.

WPTS 101 may include multiple antennas 103*a*-103*n*, e.g., an antenna array including a plurality of antennas, which may be capable of delivering wireless power 112*a*-112*c* to WPRCs 110*a*-110*c*. In some embodiments, the antennas are adaptively-phased radio frequency (RF) antennas. The WPTS 101 may be capable of determining the appropriate phases with which to deliver a coherent power transmission signal to WPRCs 110*a*-110*c*. Each antenna of the antenna array including antennas 103*a*-103*n* may be configured to emit a signal, e.g. a continuous wave or pulsed power transmission signal, at a specific phase relative to each other antenna, such that a coherent sum of the signals transmitted from a collection of the antennas is focused at a location of a respective WPRC 110*a*-110*c*. Although FIG. 1 depicts wireless signals including encoded beacon signals 111*a*-111*c*, wireless power transmission 112*a*-112*c*, and wireless data 113*a*-113*c* each being transmitted by or received by a single antenna of the antennas 103*a*-103*n* of the WPTS 101, this should not be construed as limiting in any way. Any number of antennas may be employed in the reception and transmission of signals. Multiple antennas, including a portion of antennas 103*a*-103*n* that may include all of antennas 103*a*-103*n*, may be employed in the transmission and/or reception of wireless signals. It is appreciated that use of the term "array" does not necessarily limit the antenna array to any specific array structure. That is, the antenna array does not need to be structured in a specific "array" form or geometry. Furthermore, as used herein the term "array" or "array system" may be used include related and peripheral circuitry for signal generation, reception and transmission, such as radios, digital circuits and modems.

As illustrated in the example of FIG. 1, antennas 103a-103n may be included in WPTS 101 and may be configured to transmit both power and data and to receive data. The antennas 103a-103n may be configured to provide delivery of wireless radio frequency power in a wireless power transmission environment 100, to provide data transmission, and to receive wireless data transmitted by WPRCs 110a-110c, including encoded beacon signals 111a-111c. In some embodiments, the data transmission may be through lower power signaling than the wireless radio frequency power transmission. In some embodiments, one or more of the antennas 103a-103n may be alternatively configured for data communications in lieu of wireless power delivery. In some embodiments, one or more of the power delivery antennas 103a-103n can alternatively or additionally be configured for data communications in addition to or in lieu of wireless power delivery. The one or more data communication antennas are configured to send data communications to and receive data communications from WPRCs 110a-110c.

Each of WPRCs 110a-110c may include one or more antennas (not shown) for transmitting signals to and receiving signals from WPTS 101. Likewise, WPTS 101 may include an antenna array having one or more antennas and/or sets of antennas, each antenna or set of antennas being capable of emitting continuous wave or discrete (pulse) signals at specific phases relative to each other antenna or set of antennas. As discussed above, WPTSs 101 is capable of determining the appropriate phases for delivering the coherent signals to the antennas 103a-103n. For example, in some embodiments, delivering coherent signals to a particular WPRC can be determined by computing the complex conjugate of a received encoded beacon signal at each antenna of the array or each antenna of a portion of the array such that a signal from each antenna is phased appropriately relative to a signal from other antennas employed in delivering power or data to the particular WPRC that transmitted the beacon signal. The WPTS 101 can be configured to emit a signal (e.g., continuous wave or pulsed transmission signal) from multiple antennas using multiple waveguides at a specific phase relative to each other. Other techniques for delivering a coherent wireless power signal are also applicable such as, for example, the techniques discussed in U.S. patent application Ser. No. 15/852,216 titled "Anytime Beaconing In A WPTS" filed Dec. 22, 2017 and in U.S. patent application Ser. No. 15/852,348 titled "Transmission Path Identification based on Propagation Channel Diversity" filed Dec. 22, 2017; which are expressly incorporated by reference herein.

Although not illustrated, each component of the wireless power transmission environment 100, e.g., WPRCs 110a-110c, WPTS 101, can include control and synchronization mechanisms, e.g., a data communication synchronization module. WPTS 101 can be connected to a power source such as, for example, a power outlet or source connecting the WPTSs to a standard or primary alternating current (AC) power supply in a building. Alternatively, or additionally, WPTS 101 can be powered by a battery or via other mechanisms, e.g., solar cells, etc.

As shown in the example of FIG. 1, WPRCs 110a-110c include mobile phone devices and a wireless tablet. However, WPRCs 110a-110c can be any device or system that needs power and is capable of receiving wireless power via one or more integrated WPRCs. Although three WPRCs 110a-110c are depicted, any number of WPRCs may be supported. As discussed herein, a WPRC may include one or more integrated power receivers configured to receive and process power from one or more WPTSs and provide the power to the WPRCs 110a-110c or to internal batteries of the WPRCs 110a-110c for operation thereof.

As described herein, each of the WPRCs 110a-110c can be any system and/or device, and/or any combination of devices/systems that can establish a connection with another device, a server and/or other systems within the example wireless power transmission environment 100. In some embodiments, the WPRCs 110a-110c may each include displays or other output functionalities to present or transmit data to a user and/or input functionalities to receive data from the user. By way of example, WPRC 110a can be, but is not limited to, a video game controller, a server desktop, a desktop computer, a computer cluster, a mobile computing device such as a notebook, a laptop computer, a handheld computer, a mobile phone, a smart phone, a PDA, a Blackberry device, a Treo, and/or an iPhone, etc. By way of example and not limitation, WPRC 110a can also be any wearable device such as watches, necklaces, rings or even devices embedded on or within the customer. Other examples of WPRC 110a include, but are not limited to, a safety sensor, e.g. a fire or carbon monoxide sensor, an electric toothbrush, an electronic door lock/handle, an electric light switch controller, an electric shaver, an electronic shelf label (ESL), etc.

Although not illustrated in the example of FIG. 1, the WPTS 101 and the WPRCs 110a-110c can each include a data communication module for communication via a data channel. Alternatively, or additionally, the WPRCs 110a-110c can direct antennas to communicate with WPTS 101 via existing data communications modules. In some embodiments, the WPTS 101 can have an embedded Wi-Fi hub for data communications via one or more antennas or transceivers. In some embodiments, the antennas 103a-103n can communicate via Bluetooth™, Wi-Fi™, ZigBee™, etc. The WPRCs 110a-110c may also include an embedded Bluetooth™, Wi-Fi™, ZigBee™, etc. transceiver for communicating with the WPTS 101. Other data communication protocols are also possible. In some embodiments the beacon signal, which is primarily referred to herein as a continuous waveform, can alternatively or additionally take the form of a modulated signal and/or a discrete/pulsed signal.

WPTS 101 may also include control circuit 102. Control circuit 102 may be configured to provide control and intelligence to the WPTS 101 components. Control circuit 102 may comprise one or more processors, memory units, etc., and may direct and control the various data and power communications. Control circuit 102 may direct data communications on a data carrier frequency that may be the same or different than the frequency via which wireless power is delivered. Likewise, control circuit 102 can direct wireless transmission system 100 to communicate with WPRCs 110a-110c as discussed herein. The data communications can be, by way of example and not limitation, Bluetooth™, Wi-Fi™, ZigBee™, etc. Other communication protocols are possible.

It is appreciated that the use of the term "WPTS" does not necessarily limit the WPTS to any specific structure. That is, the WPTS does not need to be structured in a specific form or geometry. Furthermore, as used herein the term "transmission system" or "WPTS" may be used to include related and peripheral circuitry for signal generation, reception and transmission, such as radios, digital circuits and modems.

Figure 2:
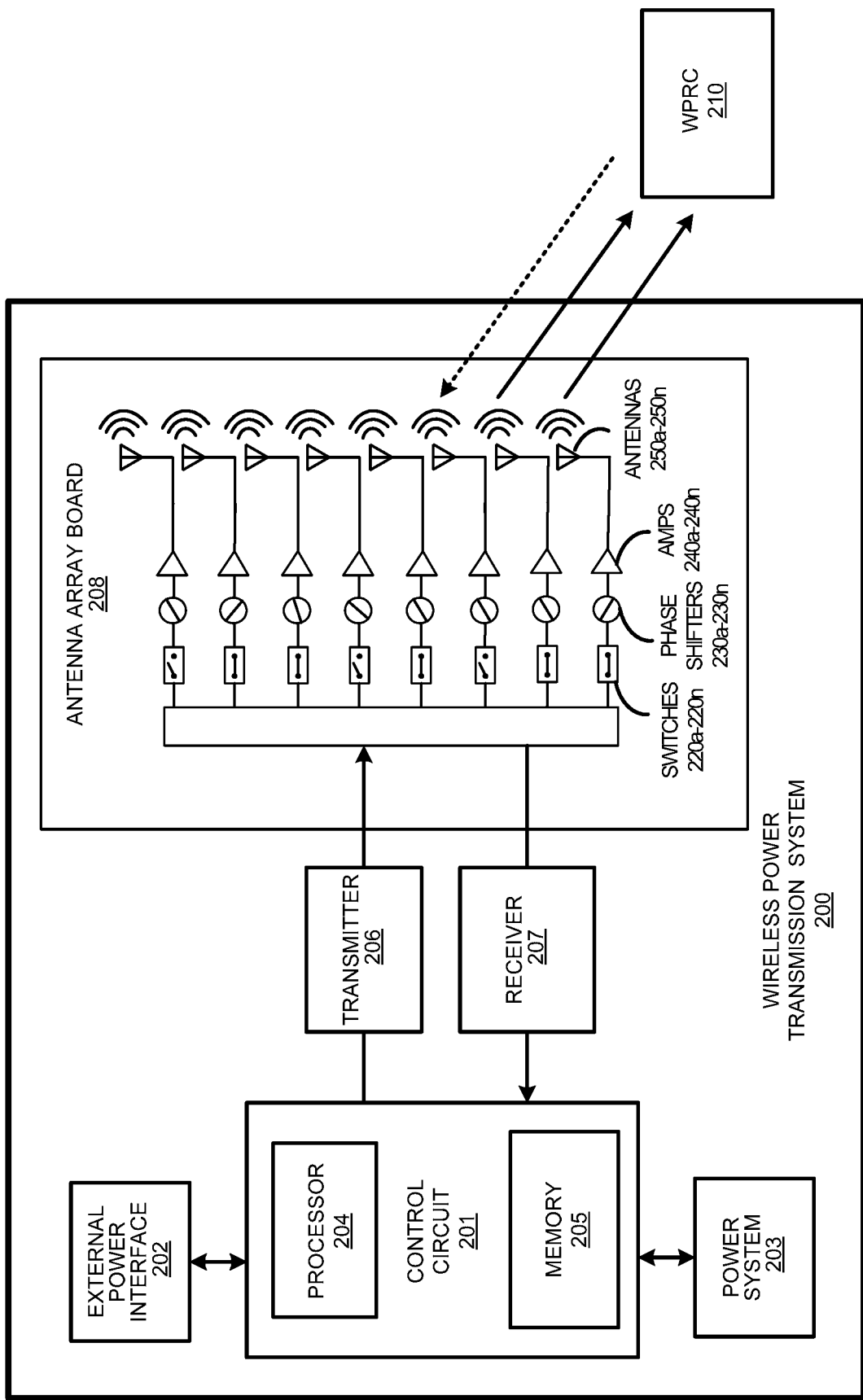
FIG. 2 is a block diagram illustrating example components of an example embodiment of a wireless power transmission system (WPTS).

FIG. 2 is a block diagram illustrating example components of a WPTS 200 in accordance with the embodiments described herein. As illustrated in the example of FIG. 2, the WPTS 200 may include a control circuit 201, external power interface 202, and power system 203. Control circuit 201 may include processor 204, for example a base band processor, and memory 205. Additionally, although only one antenna array board 208 and one transmitter 206 are depicted in FIG. 2, WPTS 200 may include one or more transmitters 206 coupled to one or more antenna array boards 208 and transmit signals to the one or more antenna array boards 208. Although only one receiver is depicted in FIG. 2, one or more receivers 207 may be coupled to the one or more antenna array boards 208 and may receive signals from the one or more antennas 250a-250n of the one or more antenna array boards 208. Each antenna array board 208 includes switches 220a-220n, phase shifters 230a-230n, power amplifiers 240a-240n, and antenna arrays 250a-250n. Although each switch, phase shifter, power amplifier, and antenna is depicted in a one-to-one relationship, this should not be construed as limiting. Additionally or alternatively, any number of switches, phase shifters, power amplifiers, and antennas may be coupled. Some or all of the components of the WPTS 200 can be omitted, combined, or sub-divided in some embodiments. Furthermore, the setting of the switches 220a-220n and phase shifters 230a-230n should not be construed as limiting. Any of the switches 220a-220n, phase shifters 230a-230n, and/or power amplifiers 240a-240n, or any combination thereof, may be individually controlled or controlled in groups. The signals transmitted and received by the one or more antenna array boards 208 may be wireless power signals, wireless data signals, or both.

Control circuit 201 is configured to provide control and intelligence to the array components including the switches 220a-220n, phase shifters 230a-230n, power amplifiers 240a-240n, and antenna arrays 250a-250n. Control circuit 201 may direct and control the various data and power communications. Transmitter 206 can generate a signal comprising power or data communications on a carrier frequency. The signal can be comply with a standardized format such as Bluetooth™, Wi-Fi™, ZigBee™, etc., including combinations or variations thereof. Additionally or alternatively, the signal can be a proprietary format that does not use Bluetooth™, Wi-Fi™, ZigBee™, and the like, and utilizes the same switches 220a-220n, phase shifters 230a-230n, power amplifiers 240a-240n, and antenna arrays 250a-250n to transmit wireless data as are used to transmit wireless power. Such a configuration may save on hardware complexity and conserve power by operating independently of the constraints imposed by compliance with the aforementioned standardized formats. In some embodiments, control circuit 201 can also determine a transmission configuration comprising a directional transmission through the control of the switches 220a-220n, phase shifters 230a-230n, and amplifiers 240a-240n based on an encoded beacon signal received from a WPRC 210.

The external power interface 202 is configured to receive external power and provide the power to various components. In some embodiments, the external power interface 202 may be configured to receive, for example, a standard external 24 Volt power supply. In other embodiments, the external power interface 202 can be, for example, 120/240 Volt AC mains to an embedded DC power supply which may source, for example, 12/24/48 Volt DC to provide the power to various components. Alternatively, the external power interface could be a DC supply which may source, for example, 12/24/48 Volts DC. Alternative configurations including other voltages are also possible.

Switches 220a-220n may be activated to transmit power and/or data and receive encoded beacon signals based on the state of the switches 220a-220n. In one example, switches 220a-220n may be activated, e.g. closed, or deactivated, e.g. open, for power transmission, data transmission, and/or encoded beacon reception. Additional components are also possible. For example, in some embodiments phase-shifters 230a-230n may be included to change the phase of a signal when transmitting power or data to a WPRC 210. Phase shifter 230a-230n may transmit a power or data signal to WPRC 210 based on a phase of a complex conjugate of the encoded beaconing signal from WPRC 210. The phase-shift may also be determined by processing the encoded beaconing signal received from WPRC 210 and identifying WPRC 210. WPTS 200 may then determine a phase-shift associated with WPRC 210 to transmit the power signal. In an example embodiment, data transmitted from the WPTS 200 may be in the form of communication beacons which may be used to synchronize clocks with WPRC 210. This synchronization may improve the reliability of beacon phase detection.

In operation, control circuit 201, which may control the WPTS 200, may receive power from a power source over external power interface 202 and may be activated. Control circuit 201 may identify an available WPRC 210 within range of the WPTS 200 by receiving an encoded beacon signal initiated by the WPRC 210 via at least a portion of antennas 250a-250n. When the WPRC 210 is identified based on the encoded beacon signal, a set of antenna elements on the WPTS may power on, enumerate, and calibrate for wireless power and/or data transmission. At this point, control circuit 201 may also be able to simultaneously receive additional encoded beacon signals from other WPRCs via at least a portion of antennas 250a-250n.

Once the transmission configuration has been generated and instructions have been received from control circuit 201, transmitter 206 may generate and transfer one or more power and/or data signal waves to one or more antenna boards 208. Based on the instruction and generated signals, at least a portion of power switches 220a-220n may be opened or closed and at least a portion of phase shifters 230a-230n may be set to the appropriate phase associated with the transmission configuration. The power and/or data signal may then be amplified by at least a portion of power amplifiers 240a-240n and transmitted at an angle directed toward a location of WPRC 210. As discussed herein, at least a portion of antennas 250a-250n may be simultaneously receiving encoded beacon signals from additional WPRCs 210.

As described above, a WPTS 200 may include one or more antenna array boards 208. In one embodiment, each antenna array board 208 may be configured to communicate with a single WPRC 210, so that a different antenna array board 208 of a plurality of antenna array boards 208 communicates with a different WPRC 210 of a plurality of WPRCs 210. Such an implementation may remove a reliance on a communication method, such as a low-rate personal area network (LR-WPAN), IEEE 802.15.4, or Bluetooth Low Energy (BLE) connection to synchronize with a WPRC 210. A WPTS 200 may receive a same message from a WPRC 210 via different antennas of antennas 250a-250n. The WPTS 200 may use the replication of the same message across the different antennas to establish a more reliable communication link. In such a scenario, a beacon power may be lowered since the lower power can be compensated by the improved reliability owed to the replicated received signals. In some embodiments, it may also be possible to dedicate certain antennas or groups of antennas for data communication and dedicate other antennas or groups of antennas for power delivery. For example, an example WPTS 200 may dedicate 8 or 16 antennas of antennas 250a-250n to data communication at a lower power level than some number of remaining antennas that may be dedicated to power delivery at a relatively higher power level than the data communication.

Figure 3:
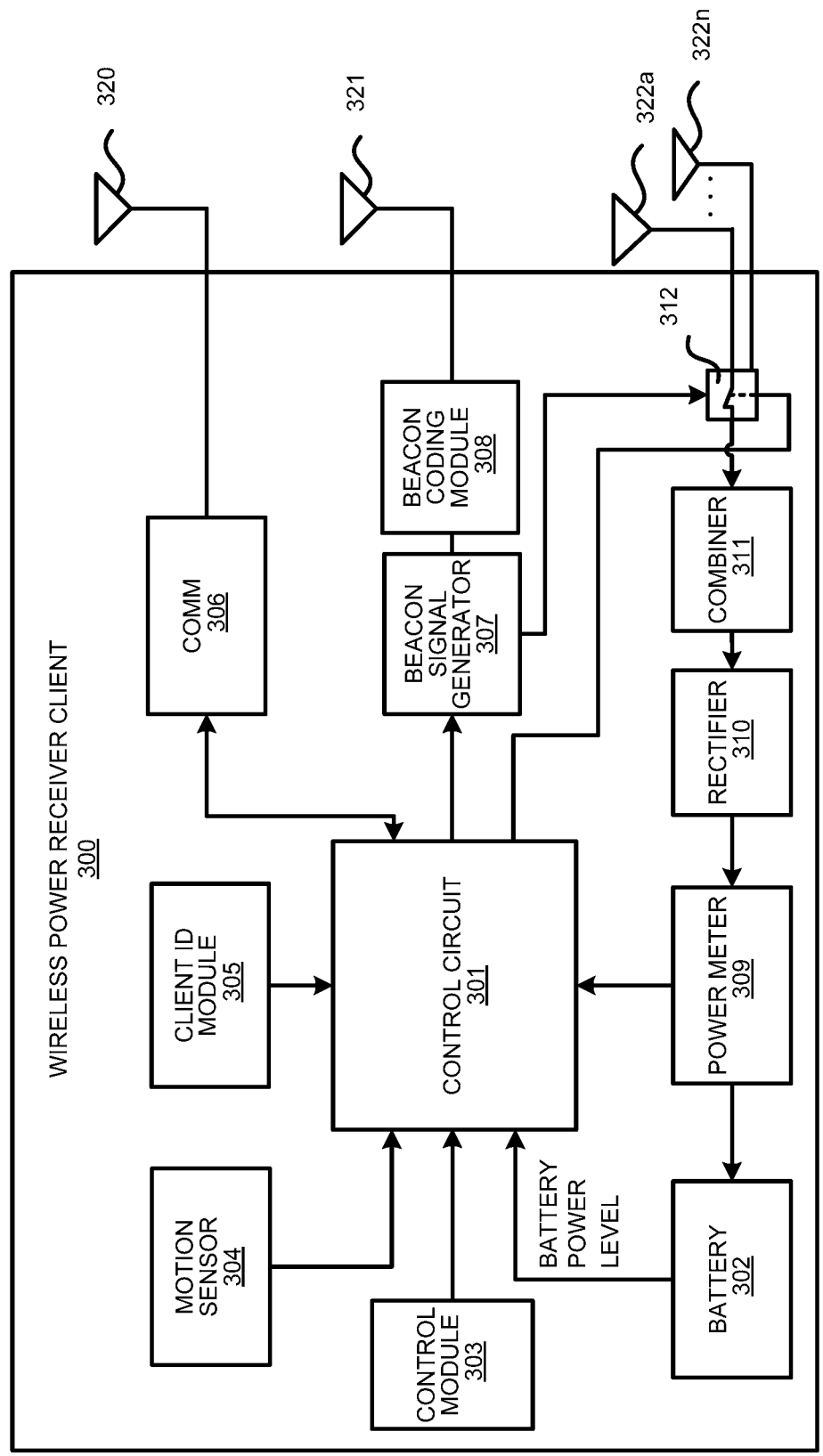
FIG. 3 is a block diagram illustrating an example embodiment of a WPRC.

FIG. 3 is a block diagram illustrating an example WPRC 300 in accordance with embodiments described herein. As shown in the example of FIG. 3, WPRC 300 may include control circuit 301, battery 302, a control module 303, for example an Internet of Things (IoT) control module, communication block 306 and associated one or more antennas 320, power meter 309, rectifier 310, a combiner 311, beacon signal generator 307, beacon coding unit 308 and associated one or more antennas 321, and switch 312 connecting the combiner 311 or the beacon signal generator 307 to one or more associated antennas 322a-322n. The battery 302 may alternatively be replaced by a capacitor. Although not depicted, the WPRC 300 may include an energy harvesting circuit which may enable the WPRC 300 to operate with a capacitor for short term energy storage instead of or in addition to using the battery. Some or all of the depicted components in FIG. 3 can be omitted, combined, or subdivided in some embodiments. Some or all of the components depicted in FIG. 3 may be incorporated in a single integrated chip (IC). It should be noted that although the WPTS 200 may use full-duplexing, WPRC 300 may additionally or alternatively use half-duplexing. A received and/or transmitted data rate may be, for example, 20 Mbps. However, higher or lower data rates may be implemented to achieve other design goals. The WPRC 300 may transmit acknowledgement (ACK) messages back to a WPTS, such as a WPTS 200 depicted in FIG. 2. Although not depicted, a local CPU may be incorporated into WPRC 300. For example, the local CPU may be included in the control circuit 301.

A combiner 311 may receive and combine the received power and/or data transmission signals received via one or more antennas 322a-322n. The combiner can be any combiner or divider circuit that is configured to achieve isolation between output ports while maintaining a matched condition. For example, the combiner 311 can be a Wilkinson Power Divider circuit. The combiner 311 may be used to combine two or more RF signals while maintaining a characteristic impedance, for example, 50 ohms. The combiner 311 may be a resistive-type combiner, which uses resistors, or a hybrid-type combiner, which uses transformers. The rectifier 310 may receive the combined power transmission signal from the combiner 311, if present, which may be fed through the power meter 309 to the battery 302 for charging. In other embodiments, each antenna's power path can have its own rectifier 310 and the DC power out of the rectifiers is combined prior to feeding the power meter 309. The power meter 309 may measure the received power signal strength and may provide the control circuit 301 with this measurement.

Battery 302 may include protection circuitry and/or monitoring functions. Additionally, the battery 302 may include one or more features, including, but not limited to, current limiting, temperature protection, over/under voltage alerts and protection, and battery capacity monitoring, for example coulomb monitoring. The control circuit 301 may receive the battery power level from the battery 302 itself. As indicated above, although not shown, a capacitor may be substituted for the battery 302 or may be implemented in addition to the battery 302. The control circuit 301 may also transmit/receive via the communication block 306 a data signal on a data carrier frequency, such as the base signal clock for clock synchronization. The beacon signal generator 307 may generate the beacon signal or calibration signal and may transmit the beacon signal or calibration signal using one or more antennas 321.

It may be noted that, although the battery 302 is shown as charged by, and providing power to, WPRC 300, the receiver may also receive its power directly from the rectifier 310. This may be in addition to the rectifier 310 providing charging current to the battery 302, or in lieu of providing charging. Also, it may be noted that the use of multiple antennas 320, 321, and 322a-322n is one example of implementation, however the structure may be reduced to one shared antenna.

In some embodiments, the control circuit 301 and/or the control module 303 can communicate with and/or otherwise derive device information from WPRC 300. The device information can include, but is not limited to, information about the capabilities of the WPRC 300, usage information of the WPRC 300, power levels of the battery or batteries 302 of the WPRC 300, and/or information obtained or inferred by the WPRC 300. In some embodiments, a client identifier (ID) module 305 stores a client ID that can uniquely identify the WPRC 300 in a wireless power delivery environment. For example, the ID can be transmitted to one or more WPTSs in the encoded beacon signal. In some embodiments, WPRCs may also be able to receive and identify other WPRCs in a wireless power delivery environment based on the client ID.

A motion sensor 304 can detect motion and may signal the control circuit 301 to act accordingly. For example, a device receiving power may integrate motion detection mechanisms such as accelerometers or equivalent mechanisms to detect motion. Once the device detects that it is in motion, it may be assumed that it is being handled by a user, and may trigger a signal to the antenna array of the WPTS to either stop transmitting power and/or data, or to initiate wireless power and/or data transmission from the WPTS. The WPRC may use the encoded beacon or other signaling to communicate with the WPTS. In some embodiments, when a WPRC 300 is used in a moving environment like a car, train or plane, the power might only be transmitted intermittently or at a reduced level unless the WPRC 300 is critically low on power.

Figure 4:
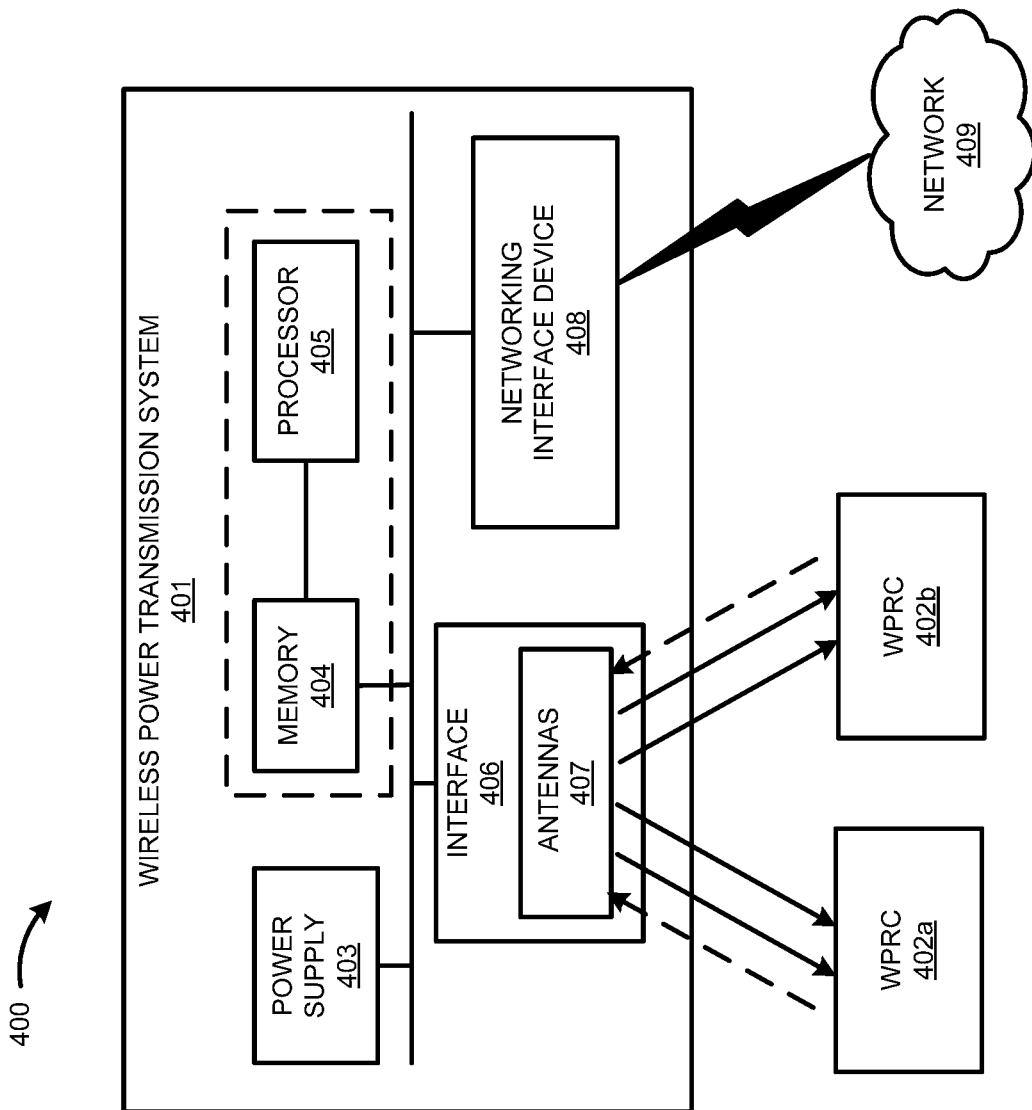
FIG. 4 is a diagram illustrating an example embodiment of a wireless signal delivery environment.

FIG. 4 is a diagram illustrating an example wireless signal delivery environment 400 in accordance with embodiments described herein. The wireless signal delivery environment 400 includes WPTS 401, a user operating WPRCs 402a and 402b, and wireless network 409. Although two WPRCs are depicted in FIG. 4, any number of WPRCs may be supported. WPTS 401 as depicted in FIG. 4 can alternatively be implemented in accordance with WPTS 101 as depicted in FIG. 1. Alternative configurations are also possible. Likewise, WPRCs 402a and 402b as depicted in FIG. 4 can be implemented in accordance with WPRCs 110a-110c of FIG. 1, or can be implemented in accordance with WPRC 300 as depicted in FIG. 3, although alternative configurations are also possible.

WPTS 401 may include a power supply 403, memory 404, processor 405, interface 406, one or more antennas 407, and a networking interface device 408. Some or all of the components of the WPTS 401 can be omitted, combined, or sub-divided in some embodiments. The networking interface device may communicate wired or wirelessly with a network 409 to exchange information that may ultimately be communicated to or from WPRCs 402a and 402b. The one or more antennas 407 may also include one or more receivers, transmitters, and/or transceivers. The one or more antennas 407 may have a radiation and reception pattern directed in a space proximate to WPRC 402a, WPRC 402b, or both, as appropriate. WPTS 401 may transmit a wireless power signal, wireless data signal, or both over at least a portion of antennas 407 to WPRCs 402a and 402b. As discussed herein, WPTS 401 may transmit the wireless power signal, wireless data signal, or both at an angle in the direction of WPRCs 402a and 402b such that the strength of the respectively received wireless signal by WPRCs 402a and 402b depends on the accuracy of the directivity of the corresponding directed transmission beams from at least a portion of antennas 407.

A fundamental property of antennas is that the receiving pattern of an antenna when used for receiving is directly related to the far-field radiation pattern of the antenna when used for transmitting. This is a consequence of the reciprocity theorem in electromagnetics. The radiation pattern can be any number of shapes and strengths depending on the directivity of the beam created by the waveform characteristics and the types of antennas used in the antenna design of the antennas 407. The types of antennas 407 may include, for example, horn antennas, simple vertical antenna, etc. The antenna radiation pattern can comprise any number of different antenna radiation patterns, including various directive patterns, in a wireless signal delivery environment 400. By way of example and not limitation, wireless power transmit characteristics can include phase settings for each antenna and/or transceiver, transmission power settings for each antenna and/or transceiver, or any combination of groups of antennas and transceivers, etc.

As described herein, the WPTS 401 may determine wireless communication transmit characteristics such that, once the antennas and/or transceivers are configured, the multiple antennas and/or transceivers are operable to transmit a wireless power signal and/or wireless data signal that matches the WPRC radiation pattern in the space proximate to the WPRC. Advantageously, as discussed herein, the wireless signal, including a power signal, data signal, or both, may be adjusted to more accurately direct the beam of the wireless signal toward a location of a respective WPRC, such as WPRCs 402a and 402b as depicted in FIG. 4.

The directivity of the radiation pattern shown in the example of FIG. 4 is illustrated for simplicity. It is appreciated that any number of paths can be utilized for transmitting the wireless signal to WPRCs 402a and 402b depending on, among other factors, reflective and absorptive objects in the wireless communication delivery environment. FIG. 4 depicts direct signal paths, however other signal paths, including multi-path signals, that are not direct are also possible.

The positioning and repositioning of WPRCs 402a and 402b in the wireless communication delivery environment may be tracked by WPTS 401 using a three-dimensional angle of incidence of an RF signal at any polarity paired with a distance that may be determined by using an RF signal strength or any other method. As discussed herein, an array of antennas 407 capable of measuring phase may be used to detect a wave-front angle of incidence. A respective angle of direction toward WPRCs 402a and 402b may be determined based on respective distance to WPRCs 402a and 402b and on respective power calculations. Alternatively, or additionally, the respective angle of direction to WPRCs 402a and 402b can be determined from multiple antenna array segments 407.

In some embodiments, the degree of accuracy in determining the respective angle of direction toward WPRCs 402a and 402b may depend on the size and number of antennas 407, number of phase steps, method of phase detection, accuracy of distance measurement method, RF noise level in environment, etc. In some embodiments, users may be asked to agree to a privacy policy defined by an administrator for tracking their location and movements within the environment. Furthermore, in some embodiments, the system can use the location information to modify the flow of information between devices and optimize the environment. Additionally, the system can track historical wireless device location information and develop movement pattern information, profile information, and preference information.

Figure 5:
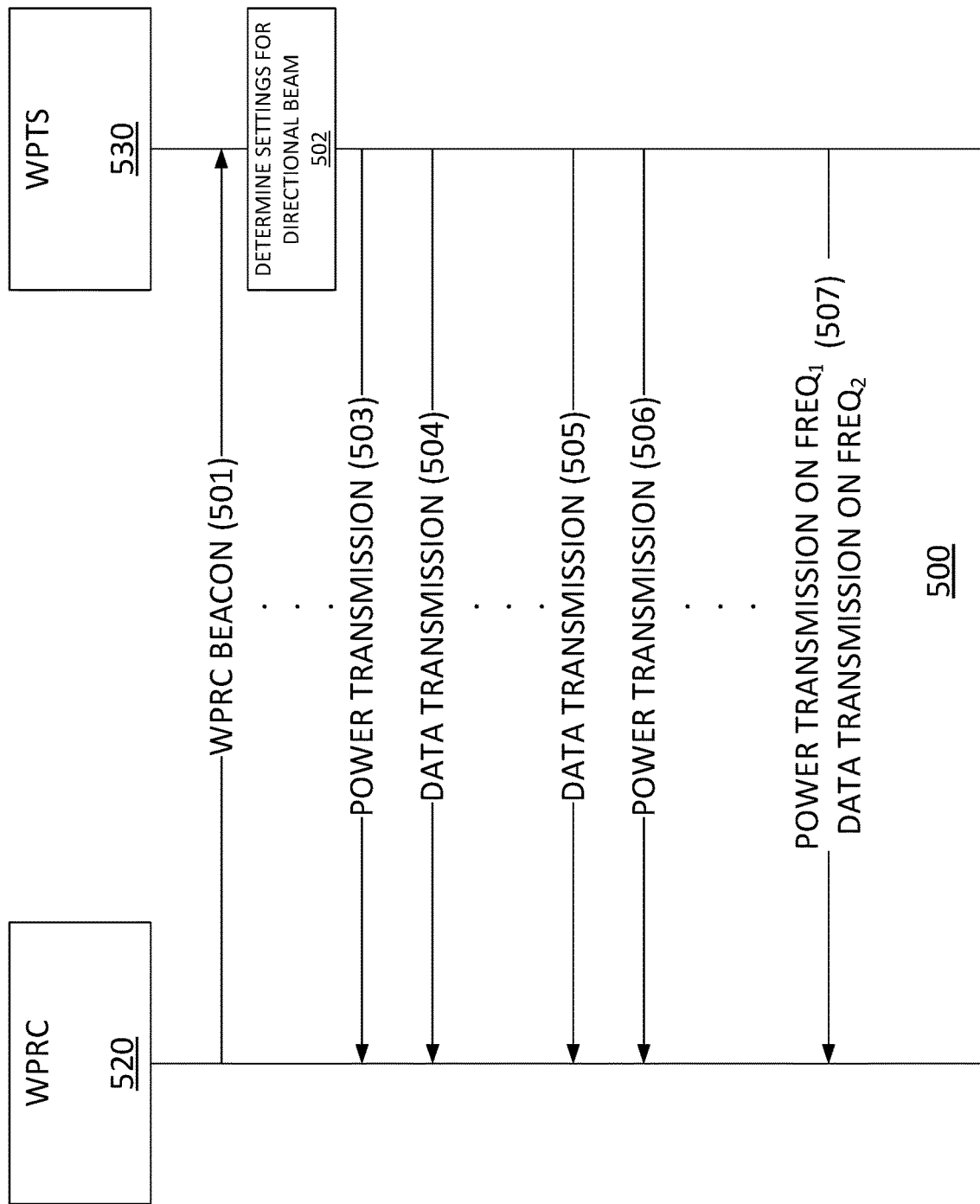
FIG. 5 is a signal diagram of an example embodiment of a signal exchange between a wireless power receiver client (WPRC) and a WPTS.

FIG. 5 is a signal diagram of an example signal exchange 500 between a WPRC 520 and a WPTS 530. WPRC 520 may transmit an encoded beacon signal to WPTS 530. Once WPTS 530 receives the beacon at 501, at 502 the WPTS 530 may calculate the appropriate phase for each antenna of at least a portion of an antenna array of the WPTS 530 to determine the transmission characteristics, for example antenna phases, necessary to transmit a directional beam to the WPRC 520. Then the WPTS 530 may directionally transmit power to the WPRC 520 at 503 and may directionally transmit data to the WPRC 520 at 504. As needed, additional data may be directionally transmitted to the WPRC 520 at 505 and then power may be directionally transmitted to the WPRC 520 at 506. Additionally or alternatively, power and data may be directionally transmitted to the WPRC 520 simultaneously via frequency multiplexing at 507, wherein power is transmitted on a first frequency $freq_1$ and data is transmitted on a second frequency $freq_2$. It should be recognized that the particular order of transmission of power and data depicted is not limiting. For example, multiple power transmissions may be transmitted in succession, multiple data transmissions may be transmitted in succession, and any other order of transmissions of power and data may be possible. Power and data may be transmitted in a multiplexed fashion. For example, power and data may be transmitted in a time multiplexed fashion, in a frequency multiplexed fashion, or in any combination of both time multiplexing and frequency multiplexing. Although not depicted in FIG. 5, additional beacons may be transmitted by WPRC 520 and the WPTS 530 may determine new transmission characteristics, such as antenna phases, based on an additional beacon to direct a transmission beam to an updated location of the WPRC 520.

Figure 6:
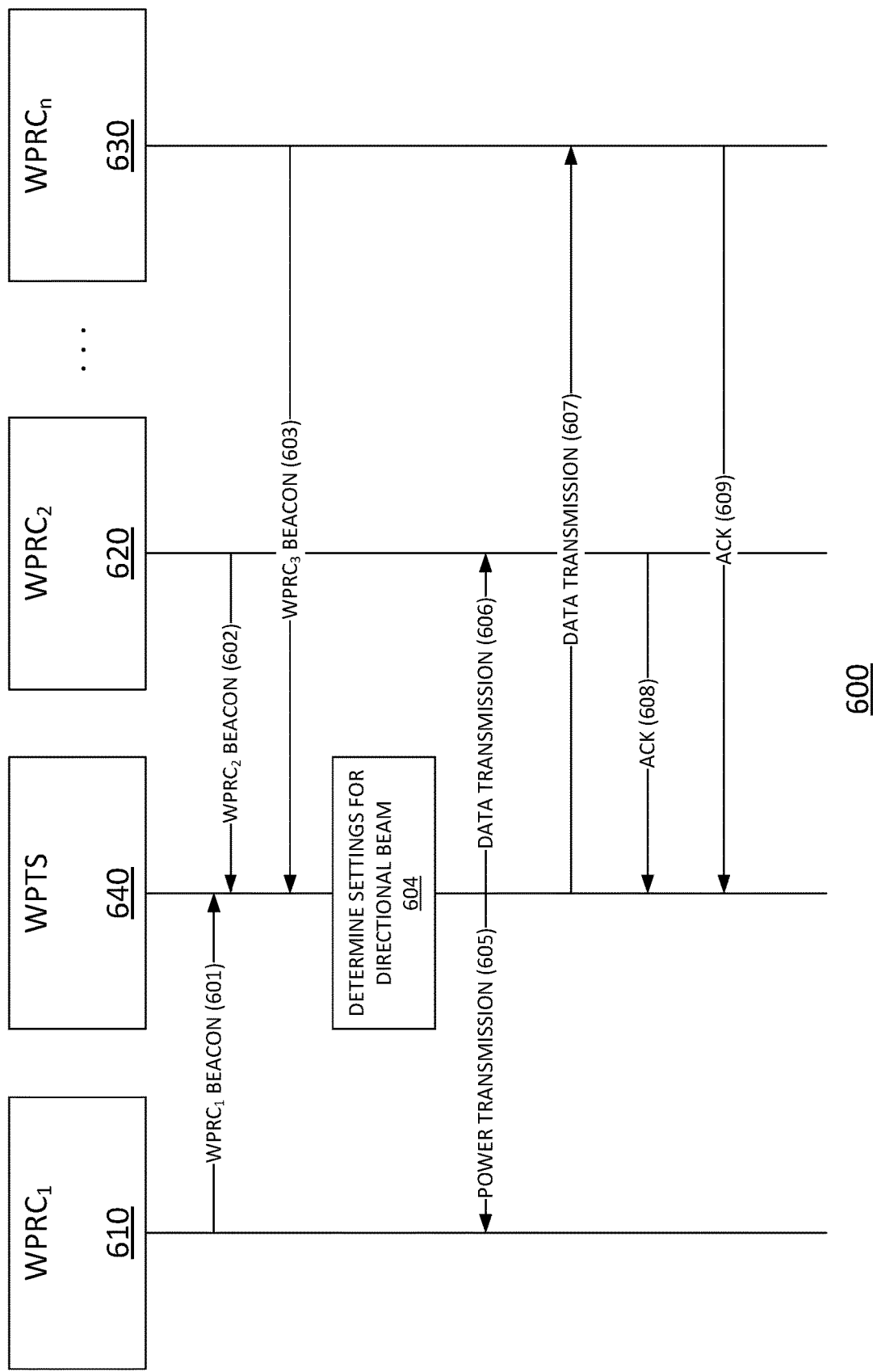
FIG. 6 is a signal diagram of an example embodiment of a signal exchange between multiple WPRCs and a WPTS.

FIG. 6 is a signal diagram of an example signal exchange 600 between multiple WPRCs 610, 620, and 630, and a WPTS 640. WPRCs 610, 620, and 630 may transmit beacons at 601, 602, and 603, respectively. Please note that the particular order of transmission is not limiting. The beacons may be transmitted in a scheduled succession, or may be transmitted in any order and any combination of beacons may be transmitted concurrently. Once WPTS 640 successfully receives the beacons, at 604 the WPTS 640 may calculate the appropriate phases for each antenna of at least a portion of an antenna array of the WPTS 640 to determine the transmission characteristics necessary to transmit a respective directional beam to the WPRCs 610, 620, and 630. It should be noted that although FIG. 6 depicts the determination of the directional beams after all beacons have been received, the WPTS 640 may determine the appropriate phases for a directional beam to each WPRC immediately after each corresponding beacon has been received. At 605, WPTS 640 may transmit wireless power to WPRC 610. At

606, WPTS 640 may transmit data to WPRC 620. At 607, WPTS 640 may transmit data to WPRC 630. Although FIG. 6 depicts a particular order for the transmission of data and power from WPTS 640, data and power may all be transmitted concurrently or any other order of transmission may be possible. Moreover, more than one WPRC may receive wireless power. At 608, WPRC 620 may transmit an acknowledgement (ACK) signal to WPTS 640 to acknowledge successful reception of data at 606. At 609, WPRC 630 may transmit an ACK signal to WPTS 640 to acknowledge successful reception of data at 607. Although the ACK signals are depicted in FIG. 6 as occurring in a particular order and after all depicted data has been transmitted by WPTS 640, this is not limiting. An ACK signal may be transmitted at any time after reception of data and an ACK signal is not necessary. An ACK signal may be optionally used to enhance reliability of communication between the WPTS 640 and the WPRCs 610, 620, and 630.

Figure 7:
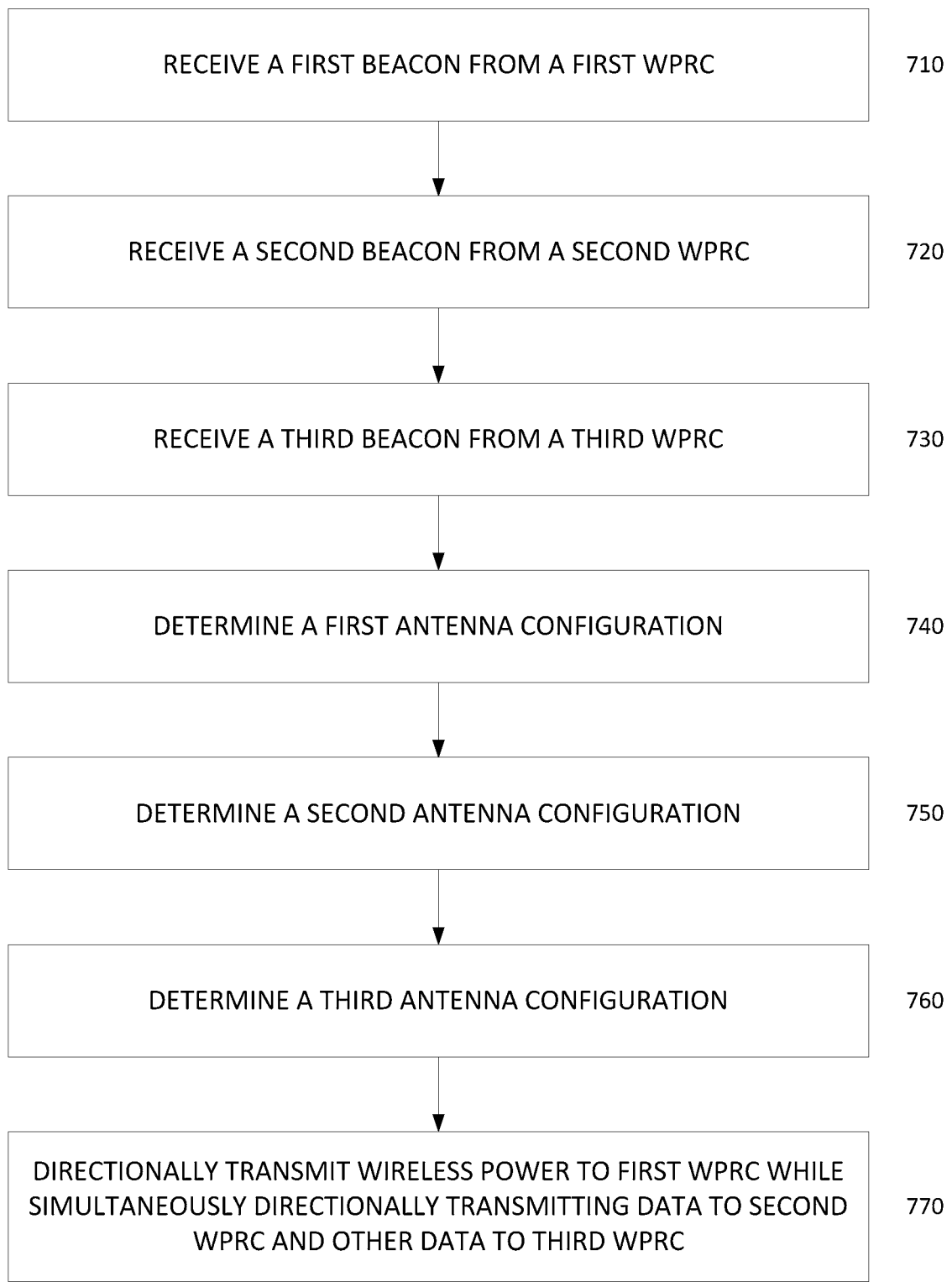
FIG. 7 depicts an example embodiment of a method performed by a WPTS.

FIG. 7 depicts an example embodiment of a method 700 performed by a WPTS. At 710, the WPTS may receive a first wireless beacon from a first WPRC. The first wireless beacon may be received via at least a first portion of an array of antennas. At 720, the WPTS may receive a second wireless beacon from a second WPRC. The second wireless beacon may be received via at least a second portion of the array of antennas. At 730, the WPTS may receive a third wireless beacon from a third WPRC. The third wireless beacon may be received via at least a third portion of an array of antennas. Additional beacons may also be received from additional WPRCs via antennas of the array of antennas. At 740, the WPTS may determine a first antenna configuration. The first antenna configuration may include phase settings for the at least first portion of the array of antennas based on the first wireless beacon. At 750, the WPTS may determine a second antenna configuration. The second antenna configuration may include phase settings for the at least second portion of the array of antennas based on the second wireless beacon. At 760, the WPTS may determine a third antenna configuration. The third antenna configuration may include phase settings for the at least third portion of the array of antennas based on the third wireless beacon. Additional antenna configurations may also be determined for additional WPRCs based on respective wireless beacons from the additional WPRCs. Additionally or alternatively, all phase settings for all antenna configurations may be determined at once. At 770, the WPTS may directionally transmit wireless power to the first WPRC while simultaneously directionally transmitting data to the second WPRC and directionally transmitting other data to the third WPRC. The wireless power may be transmitted via the at least first portion of the array of antennas using the phase settings of the first antenna configuration. The data transmitted to the second WPRC may be transmitted via the at least second portion of the array of antennas using the phase settings of the second antenna configuration. The other data transmitted to the third WPRC may be transmitted via the at least third portion of the array of antennas using the phase settings of the third antenna configuration.

In an example embodiment, the wireless power focused at the location of the first WPRC may be at a first selected power level, for example a power level of approximately +30 dBm, and the data focused at the location of the second WPRC may be at a second selected power level, for example a power level of approximately −14 dBm. In an example embodiment, the at least first portion of antennas may be the same as the at least second portion of antennas. In an example embodiment, the respective portions of antennas may be all of the antennas of the array of antennas. In some embodiments, the at least first portion of antennas may include some subset of the at least second portion of antennas. In some embodiments, there may be more or less than three WPRCs. For example, when there are two WPRCs, power may be transmitted to the first or second WPRC and data may be transmitted to the other WPRC. In yet another example embodiment, power and data may be selectively directionally transmitted to all or some subset of present WPRCs. In an example embodiment wherein both power and data are transmitted to a same WPRC, the power and data may be transmitted to the same WPRC in a multiplexed fashion. Power and/or data may be selectively transmitted to WPRCs in an on-demand fashion wherein, for example, only a WPRC that needs or requested power or that has accepted incoming data may receive the corresponding transmissions. Although FIG. 7 is depicted with a particular number and order of steps, any of the steps may be removed, reordered, sub-divided into additional steps, or combined with other steps. Furthermore, other steps not depicted may be inserted or combined with any other steps. Moreover, the method depicted in FIG. 7 may be combined with any other method or functionality described herein.

Figure 8:
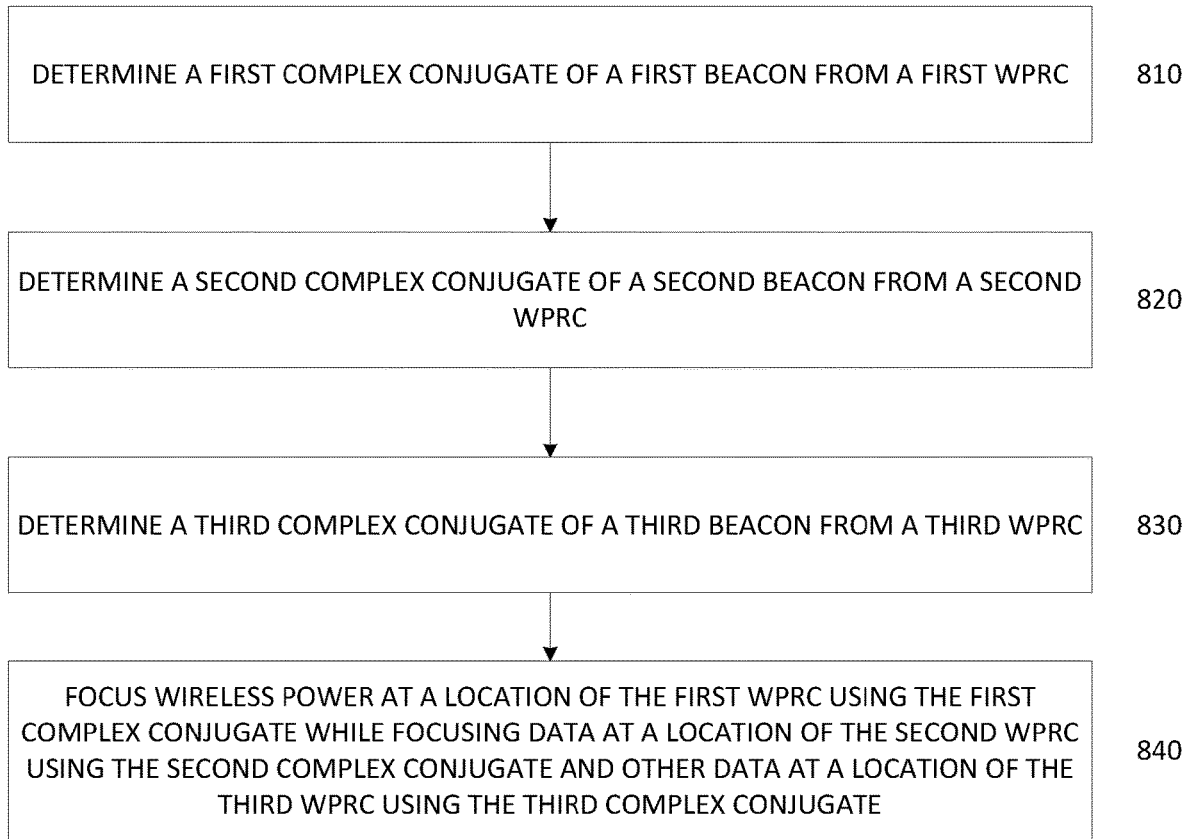
FIG. 8 depicts another example embodiment of a method performed by a WPTS.

FIG. 8 depicts another example embodiment ZOO of a method performed by a WPTS. The method depicted in FIG. 8 may, for example, be combined with the method depicted in FIG. 7 or any other method described herein. Furthermore, any embodiment of a WPTS may be configured in such a way as to be capable of executing any of the methods described herein. At 810, the WPTS may determine a first complex conjugate of a first wireless beacon from a first WPRC. At 820, the WPTS may determine a second complex conjugate of a second wireless beacon from a second WPRC. At 830, the WPTS may determine a third complex conjugate of a third wireless beacon from a third WPRC. All complex conjugates or any subset thereof may be determined concurrently. The first wireless beacon may include a first in-phase component and a first quadrature-phase component. The second wireless beacon may include a second in-phase component and a second quadrature-phase component. The third wireless beacon may include a third in-phase component and a third quadrature-phase component. In some embodiments, there may be less than or more than three WPRCs and their associated wireless beacons. At 840, the WPTS may focus wireless power that is directionally transmitted to the first WPRC at a location of the first WPRC using the first complex conjugate while focusing the data directionally transmitted to the second WPRC at a location of the second WPRC using the second complex conjugate while also focusing the data directionally transmitted to the third WPRC at a location of the third WPRC using the third complex conjugate. In an example embodiment wherein there are only two WPRCs, wireless data may only be focused, for example, at the location of the second WPRC. Additionally or alternatively, wireless data may be directionally transmitted to the first WPRC using the first complex conjugate.

In some embodiments, the first complex conjugate of the first wireless beacon may be calculated for each antenna of the at least first portion of the array of antennas. The second complex conjugate of the second wireless beacon may be calculated for each antenna of the at least second portion of the array of antennas. Additionally or alternatively, the respective complex conjugates may be calculated for a subset of antennas or only once for a group of antennas.

Figure 14:
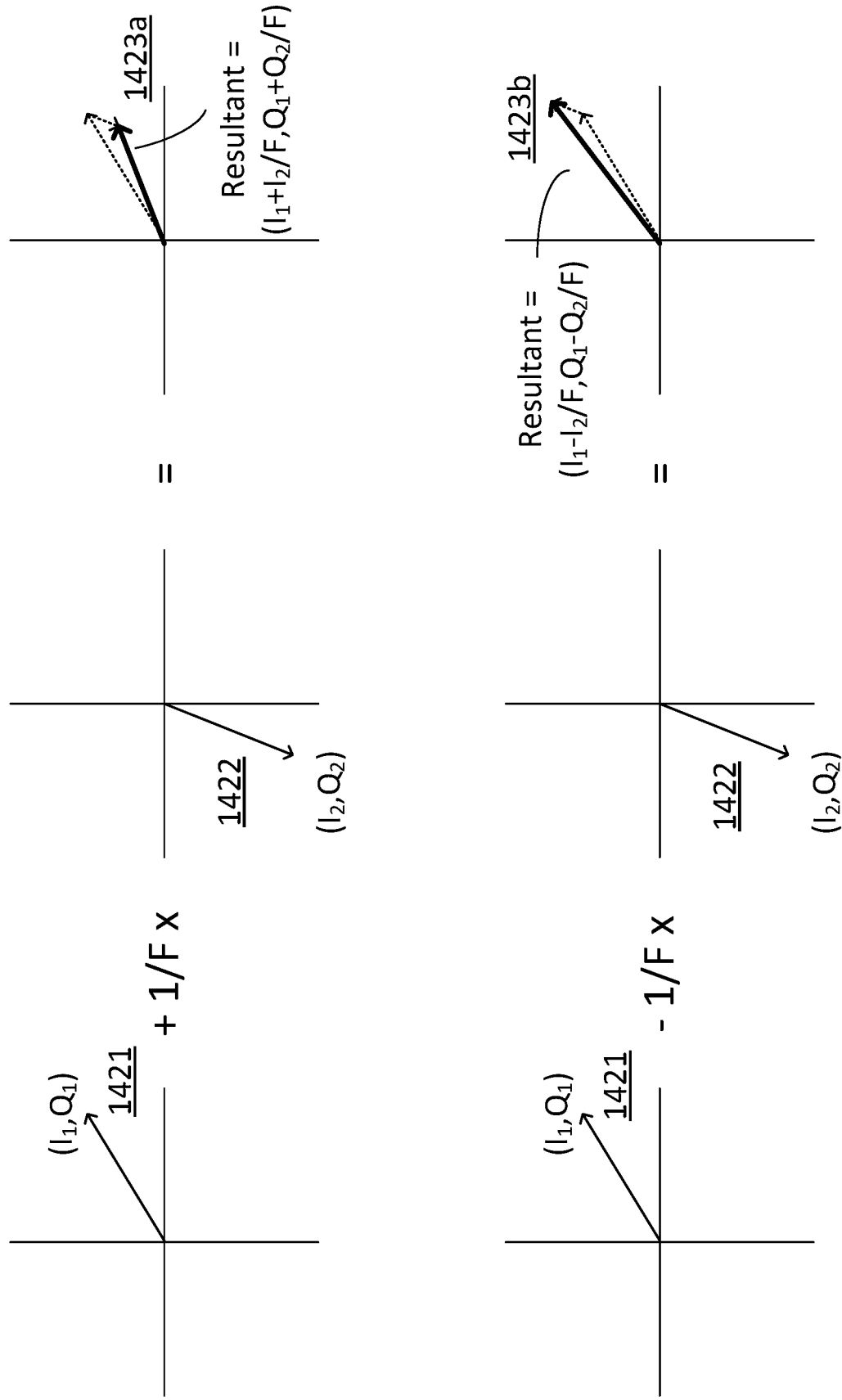
FIG. 14 depicts another series of diagrams of a vector corresponding to the first WPRC in FIG. 11 and another vector corresponding to the second WPRC in FIG. 11.

In some embodiments, the directionally transmitting both the wireless power to the first WPRC and the data to the second WPRC may be based on a sum transmission. The sum transmission may include a sum in-phase component and a sum quadrature-phase component. The sum in-phase component may be a sum of an in-phase component of the first complex conjugate and a scaled-down version of an in-phase component of the second complex conjugate and a scaled-down version of an in-phase component of the third complex conjugate. The sum quadrature-phase component may be a sum of a quadrature-phase component of the first complex conjugate and a scaled-down version of a quadrature-phase component of the second complex conjugate and a scaled-down version of a quadrature-phase component of the third complex conjugate. The scaled-down version of the quadrature-phase component of the second complex conjugate and the scaled-down version of the quadrature-phase component of the third complex conjugate may be scaled down by the same or a different amount. Furthermore, as described herein, there may be more or less than three WPRCs present. Thus, steps and procedures handling WPRC beacons and transmissions may be added or omitted accordingly. FIG. 14 may show an example of a resultant or sum transmission when there are two WPRCs present.

Figure 9:
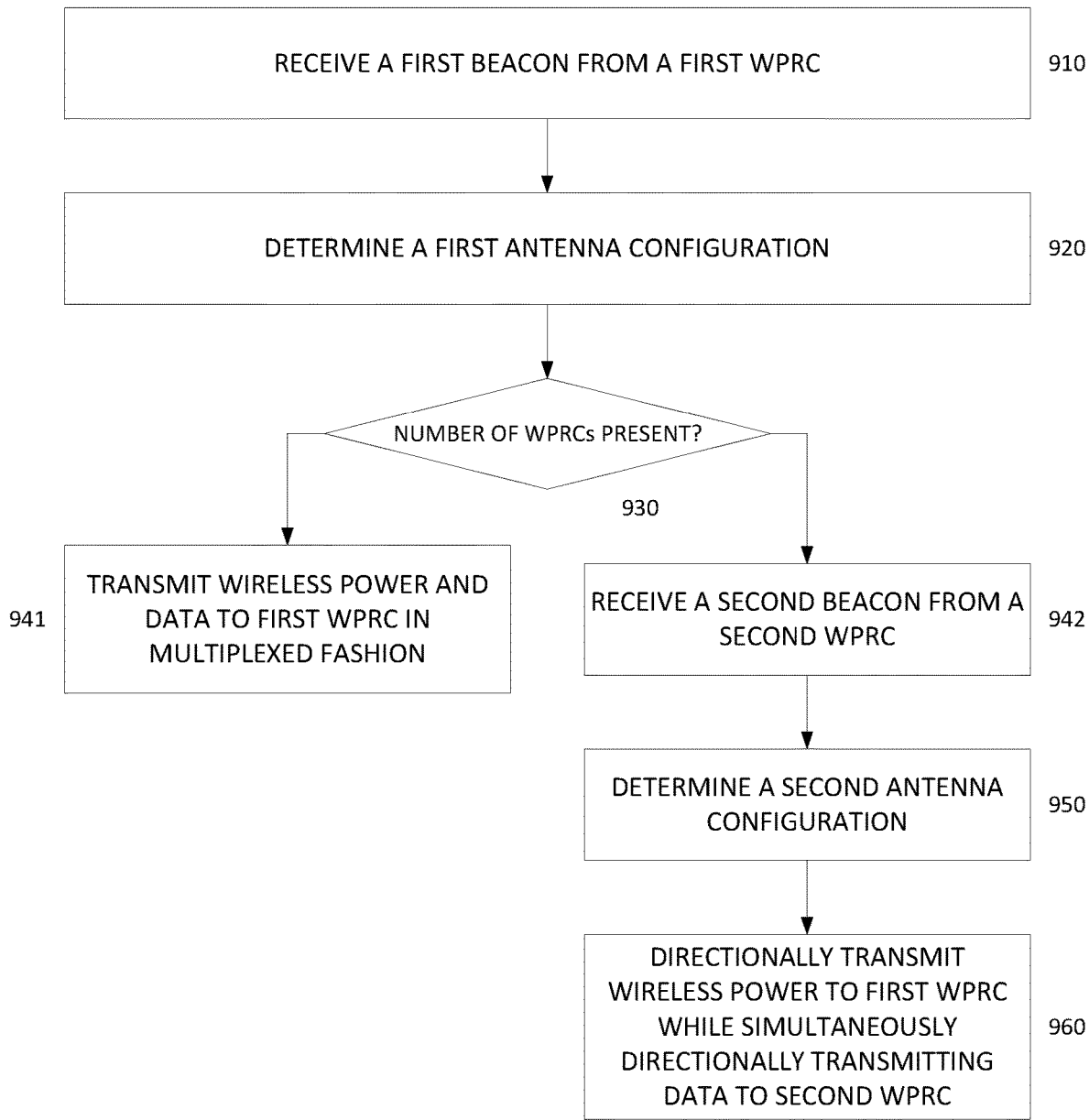
FIG. 9 depicts another example embodiment of a method performed by a WPTS.

FIG. 9 depicts another example embodiment 900 of a method performed by a WPTS. The example method depicted in FIG. 9 may be combined with any other embodiments of methods described herein. At 910, the WPTS may receive, using a wireless receiver, a first wireless beacon from a first WPRC. The first wireless beacon may be received, for example, via at least a first portion of an array of antennas. At 920, the WPTS may determine, using a processor, a first antenna configuration for the at least first portion of the array of antennas based on the first wireless beacon. The first antenna configuration may include phase settings for the at least first portion of the array of antennas. At 930, the WPTS may determine a number of WPRCs present.

On a condition that the WPTS determines that there is only one WPRC present (the first WPRC), at 941, the WPTS, using a wireless transmitter, may directionally transmit wireless power and data in a multiplexed fashion to the first WPRC. The wireless power and data may be transmitted via the at least first portion of the array of antennas using the first antenna configuration.

On a condition that the WPTS determines that there are more than one WPRC present, for example the first WPRC and a second WPRC, at 942 the WPTS may receive a second wireless beacon from the second WPRC. The second wireless beacon may be received via at least a second portion of the array of antennas. In some embodiments, the WPTS may determine how many WPRCs are present by how many different beacons are received. Thus, it should be noted that the example method and particular order of steps depicted in FIG. 9 is not meant to be limiting. The steps as depicted in FIG. 9 may be rearranged, combined, omitted, sub-divided, or otherwise modified and still fall within the scope of the embodiments described herein. At 950, the WPTS may determine a second antenna configuration for the at least second portion of the array of antennas based on the second wireless beacon. The second antenna configuration may include phase settings for the at least second portion of the array of antennas. At 960, the WPTS may directionally transmit wireless power, using the wireless transmitter, to the first WPRC using the first antenna configuration while simultaneously directionally transmitting data to the second WPRC using the second antenna configuration. In another example embodiment, a corresponding antenna configuration for each received wireless beacon may be determined only after all beacons have been received. Alternatively, the corresponding antenna configuration may be determined immediately after receiving the associated wireless beacon. The number of wireless beacons may be continuously monitored and associated antenna configurations may be updated appropriately. In some embodiments, a number of WPRCs may not change, however the respective location of the WPRCs may change. Thus, respective antenna configurations may need to be updated to directionally transmit wireless power and/or data to the respective locations of the WPRCs. Additionally or alternatively, any number of WPRCs of the number of WPRCs present may receive both wireless power and data in a multiplexed fashion. For example, power may be transmitted on a first frequency and data may be transmitted on a second frequency. Additionally or alternatively, wireless power may be transmitting in a first time period and wireless data may be transmitted in a second time period. Additionally or alternatively, only wireless power or data may be transmitted to any number of the WPRCs present.

FIG. 10 depicts an example format for a beacon signal 1000 transmitted by a WPRC to a WPTS. The beacon signal 1000 may include a preamble 1010, an ID of a target WPTS 1020, an ID of the WPRC 1030 that is transmitting the beacon, a session ID 1040, a message type 1050, a payload 1060, and a checksum 1070. Although the beacon 1000 is depicted with data arranged in a particular order, this order is not limiting. Any order or the data may be possible. Also, any of the data depicted may be omitted, combined with other data, or sub-divided into more granular data categories. Additionally, other data not depicted may be transmitted within the beacon signal 1000. Moreover, the depiction of the relative portion of the beacon dedicated to a particular type of data should not be construed as limiting. Also, a beacon should not be construed as having the same data and portions dedicated to the data from a first transmitted beacon to a subsequently transmitted beacon. Moreover, a beacon transmitted by a first WPRC does not need to have the same content or structure as a beacon transmitted by another WPRC.

The session ID 1040 may be a designated null or other value, such as −1, if a session has not been established. The message type 1050 may be a start session message type, a join network message type, a request for power message type, application data type, or other appropriate message type. The request for power may be followed by, for example, pseudo-randomly generated data for beacon detection. The application data may be coupled with a variable payload size of data bytes. The beacon may have a set maximum length, for example, 256 bytes. The maximum length of the beacon can be another size that may depend on the particular implementation.

An example embodiment of a beacon 1000 may be split into two parts to enable full duplex communication. For example, the preamble 1010, target WPTS ID 1020, WPRC ID 1030, message type 1050, and data payload may be transmitted in a first frequency channel. However, when the message type indicates a power transmission, the preamble 1010, target WPTS ID 1020, WPRC ID 1030, and message type 1050 may be transmitted on the first frequency channel and the power may be transmitted on a different frequency channel.

Figure 11:
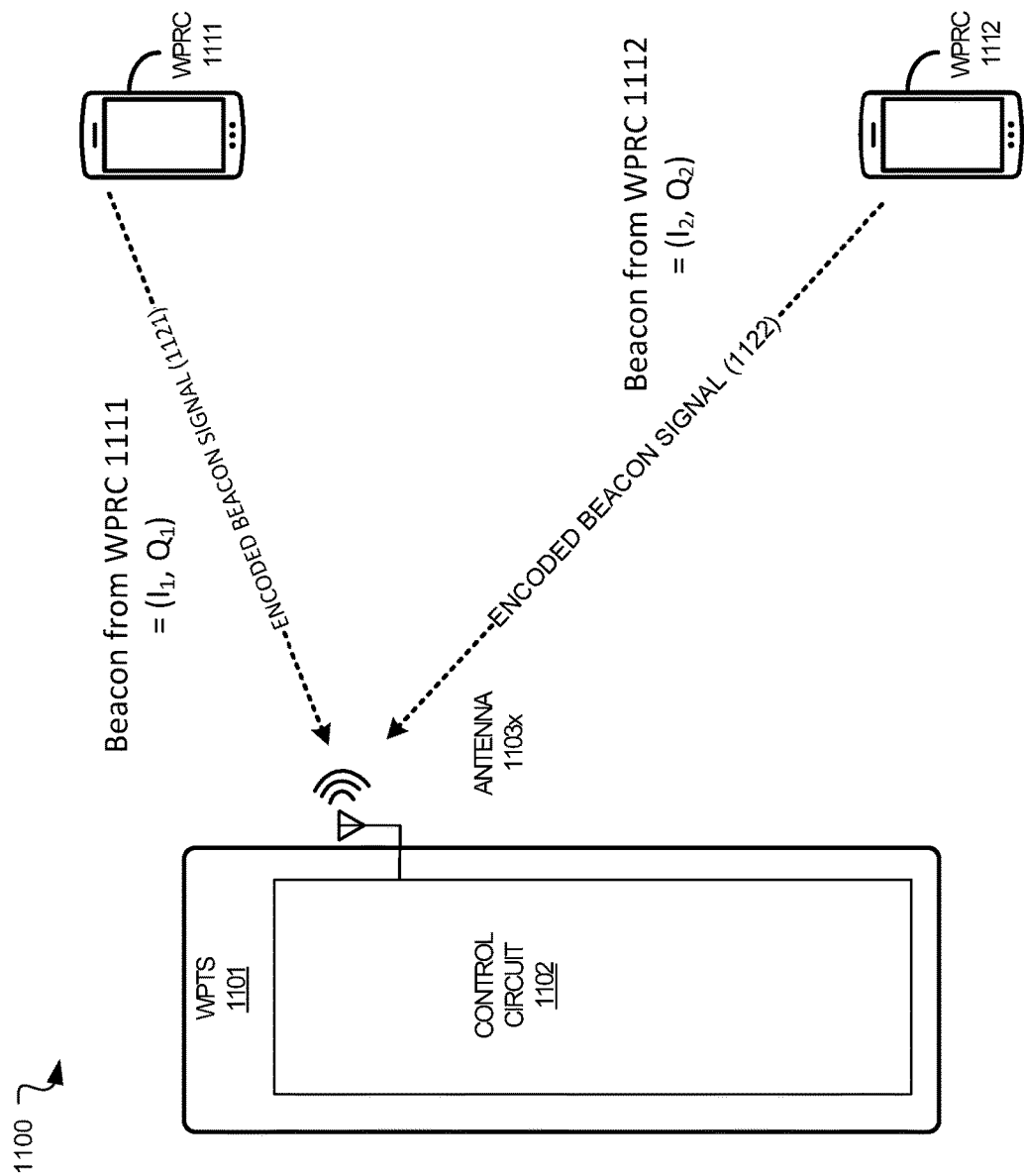
FIG. 11 is a diagram depicting an example embodiment of a system including a WPTS and two WPRCs.

FIG. 11 is a diagram depicting a system 1100 including a WPTS 1101, WPRC 1111, and WPRC 1112. WPTS 1101 is depicted in FIG. 11 with a single antenna 1103x for clarity of illustration only receiving a beacon 1121 from WPRC 1111 and a beacon 1122 from WPRC 1112. WPTS 1101 may include a plurality of antennas, each receiving respective beacons at a respective phase.

Figure 12:
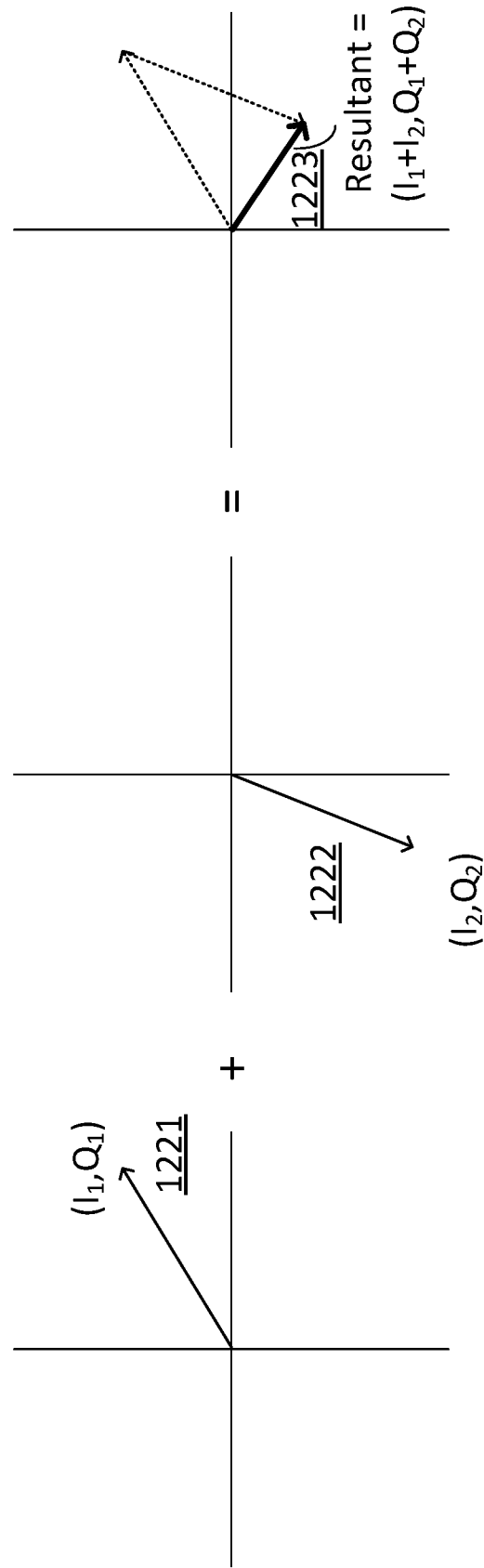
FIG. 12 depicts a series of diagrams of a vector corresponding to a first WPRC in FIG. 11 and another vector corresponding to a second WPRC in FIG. 11.

FIG. 12 depicts a series of diagrams of vector $(I_1,Q_1)$ 1221 corresponding to WPRC 1110 in FIG. 11 and vector $(I_2,Q_2)$ 1222 corresponding to WPRC 1120 in FIG. 11. The sum of the vector $(I_1,Q_1)$ 1221 and vector $(I_2,Q_2)$ 1222 results in a vector $(I_1+I_2,Q_1+Q_2)$ 1223. A WPTS emitting from a plurality of antennas at a respective vector 1223 phase based on what was measured from the received beacon at each of the plurality of antennas, two foci of signals may be created. Thus, each antenna of the plurality of antennas that measures a received beacon may transmit at a different phase based on what was measured.

Figure 13:
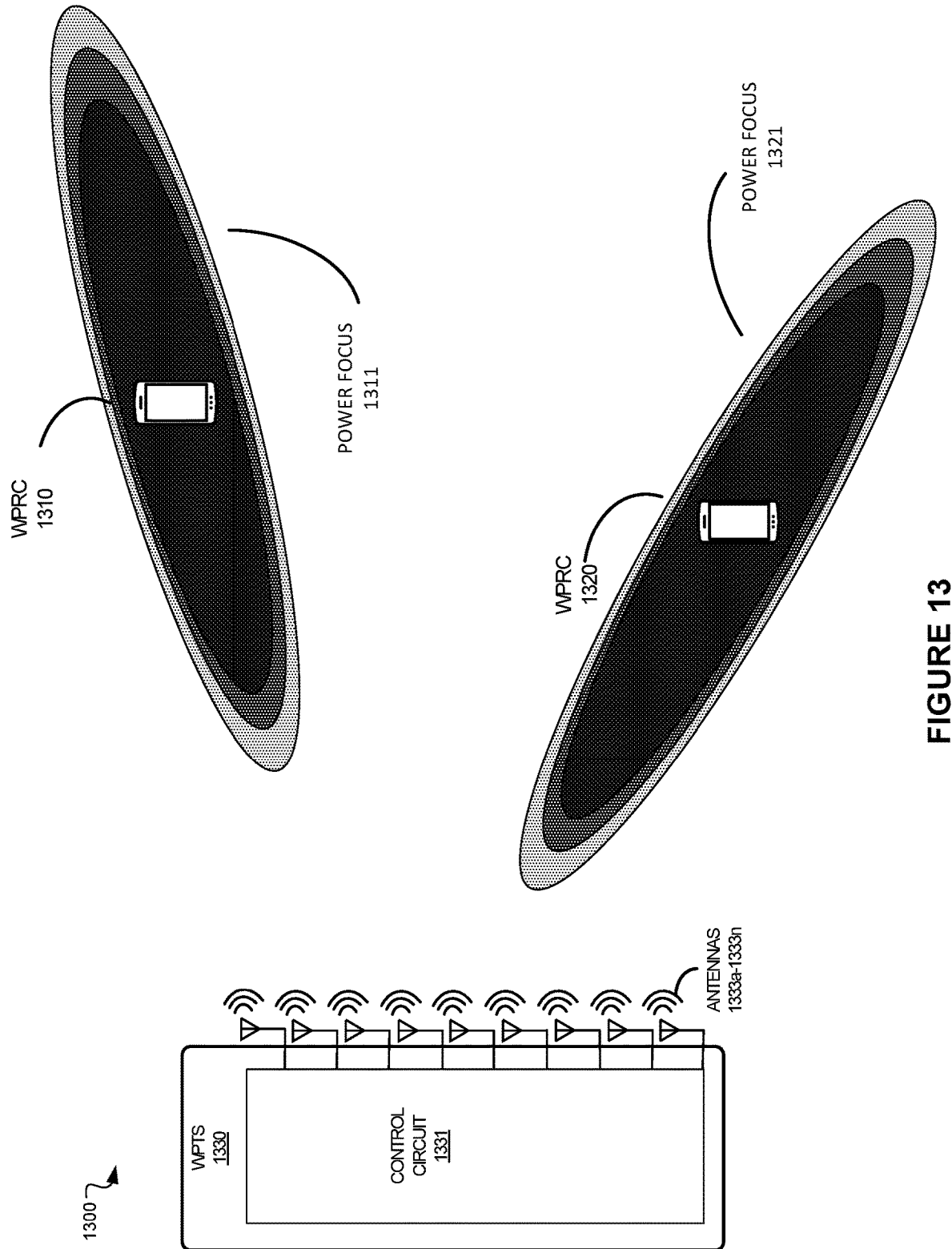
FIG. 13 is a diagram depicting an example of focused, directional wireless power transmission from a WPTS to two different WPRCs.

FIG. 13 is a diagram depicting an example of focused, directional wireless power transmission from a WPTS 1330 to two different WPRCs. WPRC 1310 may receive wireless power 1311 focused at a location of WPRC 1310. WPRC 1320 may receive wireless power 1321 focused at a location of WPRC 1320. The shading of the power foci darken towards the center of the respective power foci to indicate that in practice the power level increases towards the center of the respective foci. However, in practice, the regions may not be as uniform as depicted in FIG. 13.

FIG. 14 depicts a series of diagrams of vector $(I_1,Q_1)$ 1421 corresponding to WPRC 1110 in FIG. 11 and vector $(I_2,Q_2)$ 1422 corresponding to WPRC 1120 in FIG. 11. The vector $(I_1,Q_1)$ 1421 corresponding to a power signal for WPRC 1110 may be slightly modified by a scaled-down version of vector $(I_2,Q_2)$ 1422 corresponding to a data signal for WPRC 1120. The scaling factor may be denoted as 1/F, as depicted in FIG. 14. As such, the focus at the location of WPRC 1110 may be only slightly impacted. Also, as a result of the slight modification by the scaled-down version of vector $(I_2,Q_2)$ 1422, a new faint focus may be created at the location of WPRC 1120. Hence, the WPTS 1130 may transmit power to WPRC 1110 while encoding a data bit '0' using a resultant vector $(I_1+I_2/F,Q_1+Q_2/F)$. The WPTS 1130 may transmit power to WPRC 1110 while encoding a data bit '1' using a resultant vector $(I_1-I_2/F,Q_1-Q_2/F)$. Alternatively, the WPTS 1130 may transmit power to WPRC 1110 while encoding a data bit '1' using a resultant vector $(I_1+I_2/F,Q_1+Q_2/F)$. The WPTS 1130 may transmit power to WPRC 1110 while encoding a data bit '0' using a resultant vector $(I_1-I_2/F,Q_1-Q_2/F)$. In other words, a scaled-down version of vector 1422 may be modulated by 180° to transmit bits of data to 1120.

Figure 15:
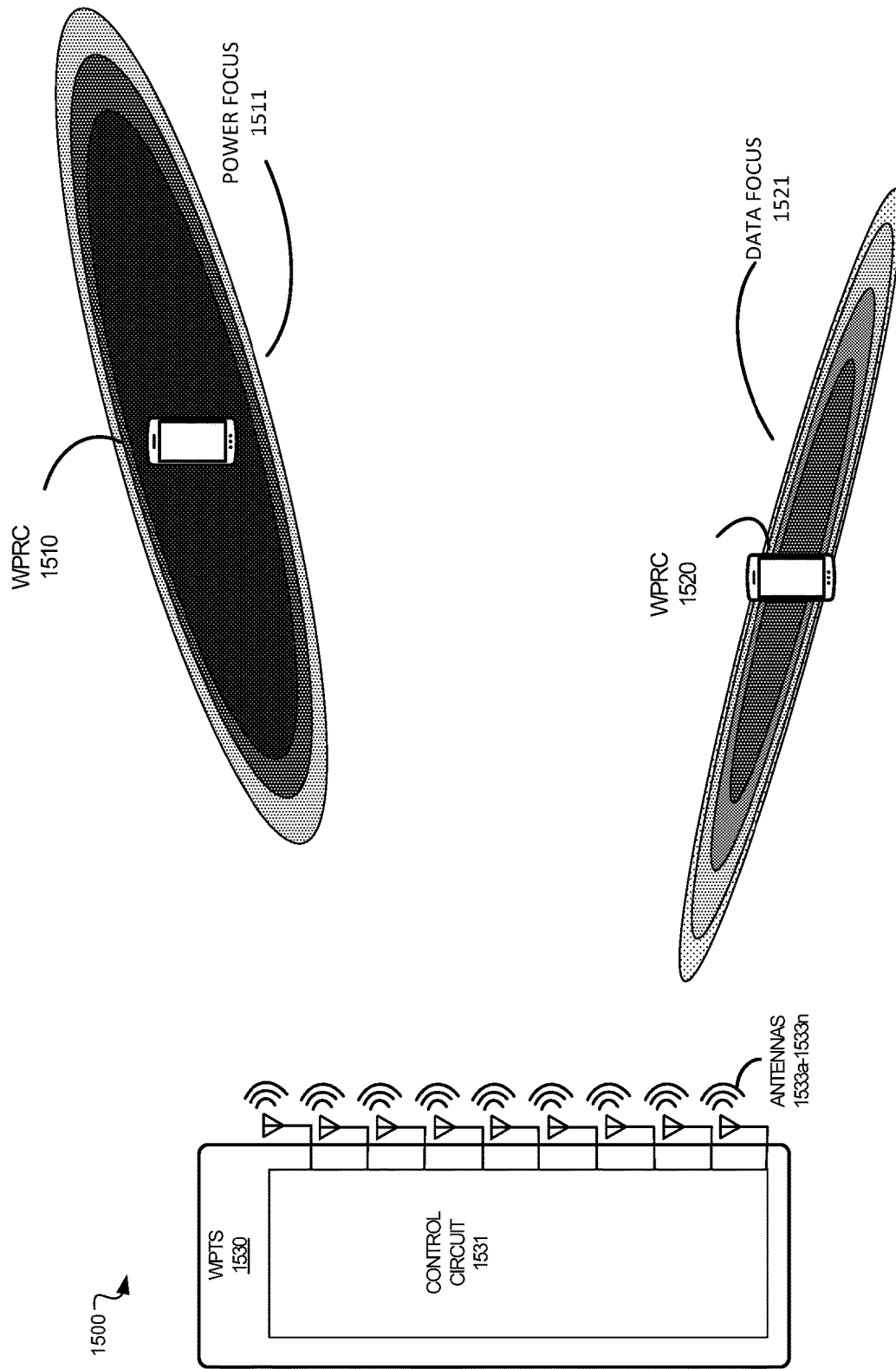
FIG. 15 is a diagram depicting an example of focused, directional wireless power transmission from a WPTS to a first WPRC simultaneous to focused, directional wireless data transmission from the WPTS to a second WPRC.

FIG. 15 is a diagram depicting an example of focused, directional wireless power transmission from a WPTS 1530 to WPRC 1510 simultaneous to focused, directional wireless data transmission from WPTS 1530 to WPRC 1520. WPRC 1510 may receive wireless power 1511 focused at a location of WPRC 1510. WPRC 1520 may receive wireless data 1521 focused at a location of WPRC 1520. The shading of the foci darken towards the center of the respective foci to indicate that the power level increases towards the center of the respective foci. In this example, the power focus is depicted with darker shading than the data focus to indicate higher power levels for the wireless power transmission at the power focus 1511 than the power levels of the wireless data transmission at the data focus 1521. The relative shading and power levels indicated thereby is not meant to be limiting. In practice, the foci regions may not be as uniform as depicted in FIG. 15. In some embodiments, a same transmitter used to transmit wireless power to WPRC 1510 may be used to transmit wireless data to WPRC 1520.

For each antenna of an example WPTS, an in-phase part and quadrature-phase part may be represented by a number of bits depending on the accuracy desired. In one example, the in-phase part and quadrature-phase part may each be represented by 14 bits for each antenna. In one example embodiment, the WPTS may transmit with two signal foci. A first focus located at a first WPRC and corresponding to a wireless transmission of power may be at a first selected power level, for example a power level of +30 dBm, and a second focus located at a second WPRC and corresponding to a wireless transmission of data may be at a second selected power level, for example a power level of −14 dBm. A data rate of the data transmission may be encoded at a rate of the beacon, which may be, for example, a rate of 10-20 Mbps.

An example embodiment of a WPTS may scale a data focus to any desired power, provided Federal Communications Commission (FCC) rules are followed, for example Part 15. Thus, by scaling power of a data focus, it may be possible to implement a WPRC without an amplifier for amplifying received signals. By scaling the power of the data focus to a level where the received data signal does not require amplification by the WPRC, the power consumption of the WPRC may be reduced. Furthermore, the power level of the focused, directional data signals received from the WPTS may be much greater than a power level of another WPRC's beacon signal. In such a scenario, WPRCs may not be able to hear each other's beacon signal, which may simplify a communication protocol stack. Additionally or alternatively, a WPRC may wake up due to the power level of the incoming data signal from the WPTS and thus may not need to monitor for a preamble from the WPTS.

As described above, an example embodiment of a WPTS may transmit data without the use of a side-channel communication interface such as Wi-Fi, Bluetooth, etc. In such an example embodiment, a simplified WPRC may be implemented with a single IC. In some embodiments, a separate external CPU may be included for larger workloads. The WPRC may also operate with very low power since the data signal from the WPTS may be focused on the location of the WPRC and with a sufficient enough power that the received data signal may not need amplification by the WPRC. Such a directional data transmission from a WPTS to various WPRCs enables a simplified WPRC with reduced power consumption. In one example embodiment of a WPRC, reduced cost and increased performance electronic shelf labels (ESLs) may be implemented. The security of the communication link established between the WPTS and WPRC may also be secure in that data from the WPTS is focused only at the location of the WPRC. The data may fall under a noise floor elsewhere and may thus be undiscernible to an unintended recipient. Furthermore, collision detection may not be necessary in such a directionally guided transmission link because the WPRCs may not hear each other due to free space path loss.

Although features and elements are described above in particular combinations, one of ordinary skill in the art will appreciate that each feature or element can be used alone or in any combination with the other features and elements. In addition, the methods described herein may be implemented in a computer program, software, or firmware incorporated in a computer-readable medium for execution by a computer or processor. Examples of computer-readable media include electronic signals (transmitted over wired or wireless connections) and computer-readable storage media. Examples of computer-readable storage media include, but are not limited to, a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs). A processor in association with software may be used to implement a WPTS or WPRC.

What is claimed is:

1. A wireless power receiver client (WPRC) comprising:
a wireless transmitter configured to transmit a first wireless beacon, wherein the first wireless beacon includes a first in-phase component and a first quadrature-phase component; and
a wireless receiver configured to receive wireless data from a wireless power transmission system (WPTS), wherein the wireless data is directionally focused at a location of the WPRC;
wherein the received wireless data is received as part of a sum transmission from the WPTS, wherein the sum transmission includes a sum in-phase component and a sum quadrature-phase component, wherein the sum in-phase component is based on a sum of an in-phase component of a complex conjugate of a second wireless beacon that is transmitted by a second WPRC and a scaled-down version of an in-phase component of a complex conjugate of the first wireless beacon, and wherein the sum quadrature-phase component is based on a sum of a quadrature-phase component of the complex conjugate of the second wireless beacon and a scaled-down version of a quadrature-phase component of the complex conjugate of the first wireless beacon.

2. The WPRC of claim 1, wherein a wireless power directionally focused at a location of the second WPRC is received by the second WPRC simultaneously to the wireless data being received by the WPRC.

3. The WPRC of claim 2, wherein the wireless power is received as part of the sum transmission based at least in part on the in-phase component of the complex conjugate of the second wireless beacon and the quadrature-phase component of the complex conjugate of the second wireless beacon.

4. The WPRC of claim 3, wherein a power level of the wireless data directionally focused at the location of the WPRC is relatively lower than a power level of the wireless power directionally focused at the location of the second WPRC.

5. The WPRC of claim 1, wherein the scaled-down version of the in-phase component of the complex conjugate of the first wireless beacon and the scaled-down version of the quadrature-phase component of the complex conjugate of the first wireless beacon are scaled-down by a selected amount.

6. The WPRC of claim 1, wherein the sum transmission further includes other wireless data that is directionally focused at a location of a third WPRC.

7. The WPRC of claim 1, wherein the first wireless beacon is a coded with at least one of a preamble, an identity of the WPTS, an identity of the WPRC, a session ID, a message type, or a payload.

8. A method performed by a wireless power receiver client (WPRC), the method comprising:
transmitting a first wireless beacon, wherein the first wireless beacon includes a first in-phase component and a first quadrature-phase component; and
receiving wireless data from a wireless power transmission system (WPTS), wherein the wireless data is directionally focused at a location of the WPRC;
wherein the received wireless data is received as part of a sum transmission from the WPTS, wherein the sum transmission includes a sum in-phase component and a sum quadrature-phase component, wherein the sum in-phase component is based on a sum of an in-phase component of a complex conjugate of a second wireless beacon that is transmitted by a second WPRC and a scaled-down version of an in-phase component of a complex conjugate of the first wireless beacon, and wherein the sum quadrature-phase component is based on a sum of a quadrature-phase component of the complex conjugate of the second wireless beacon and a scaled-down version of a quadrature-phase component of the complex conjugate of the first wireless beacon.

9. The method of claim 8, wherein the receiving the wireless data is simultaneous to a wireless power directionally focused at a location of the second WPRC being received by the second WPRC.

10. The method of claim 9, wherein the wireless power is received as part of the sum transmission based at least in part on the in-phase component of the complex conjugate of the second wireless beacon and the quadrature-phase component of the complex conjugate of the second wireless beacon.

11. The method of claim 10, wherein a power level of the wireless data directionally focused at the location of the WPRC is relatively lower than a power level of the wireless power directionally focused at the location of the second WPRC.

12. The method of claim 8, wherein the scaled-down version of the in-phase component of the complex conjugate of the first wireless beacon and the scaled-down version of the quadrature-phase component of the complex conjugate of the first wireless beacon are scaled-down by a selected amount.

13. The method of claim 8, wherein the sum transmission further includes other wireless data that is directionally focused at a location of a third WPRC.

14. The method of claim 8, wherein the first wireless beacon is a coded with at least one of a preamble, an identity of the WPTS, an identity of the WPRC, a session ID, a message type, or a payload.

15. A wireless power receiver client (WPRC) comprising:
a wireless transmitter configured to transmit a first wireless beacon, wherein the first wireless beacon includes a first in-phase component and a first quadrature-phase component; and
a wireless receiver configured to receive wireless power from a wireless power transmission system (WPTS), wherein the wireless power is directionally focused at a location of the WPRC;
wherein the received wireless power is received as part of a sum transmission from the WPTS, wherein the sum transmission includes a sum in-phase component and a sum quadrature-phase component, wherein the sum in-phase component is based on a sum of a scaled-down version in-phase component of a complex conjugate of a second wireless beacon that is transmitted by a second WPRC and an in-phase component of a complex conjugate of the first wireless beacon, and wherein the sum quadrature-phase component is based on a sum of a scaled-down version of a quadrature-phase component of the complex conjugate of the second wireless beacon and a quadrature-phase component of the complex conjugate of the first wireless beacon.

16. The WPRC of claim 15, wherein the wireless power directionally focused at the location of the WPRC is received simultaneously to wireless data directionally focused at a location of the second WPRC being received by the second WPRC.

17. The WPRC of claim 16, wherein the wireless data is part of the sum transmission based at least in part on the scaled-down version of the in-phase component of the complex conjugate of the second wireless beacon and the scaled-down version of the quadrature-phase component of the complex conjugate of the second wireless beacon.

18. The WPRC of claim 17, wherein a power level of the wireless data directionally focused at the location of the second WPRC is relatively lower than a power level of the wireless power directionally focused at the location of the WPRC.

19. The WPRC of claim 15, wherein the scaled-down version of the in-phase component of the complex conjugate of the second wireless beacon and the scaled-down version of the quadrature-phase component of the complex conjugate of the second wireless beacon are scaled-down by a selected amount.

20. The WPRC of claim 15, wherein the sum transmission further includes other wireless data that is directionally focused at a location of a third WPRC.

* * * * *